US012574373B2

(12) United States Patent
Olsen et al.

(10) Patent No.: US 12,574,373 B2
(45) Date of Patent: Mar. 10, 2026

(54) REMOTELY CONFIGURING COMMUNICATION RESTRICTIONS

(71) Applicant: Apple Inc., Cupertino, CA (US)

(72) Inventors: Reed E. Olsen, San Jose, CA (US); Todd R. Fernandez, Mountain View, CA (US); Jeffrey D. Harris, Berkeley, CA (US); Albert R. Howard, Sunnyvale, CA (US); Paul W. Salzman, Palo Alto, CA (US); Bryce D. Wolfson, San Jose, CA (US); Christopher G. Skogen, Los Altos Hills, CA (US); David A. Steinberg, San Francisco, CA (US); Nolan A. Astrein, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 585 days.

(21) Appl. No.: 16/862,957

(22) Filed: Apr. 30, 2020

(65) Prior Publication Data

US 2020/0358765 A1      Nov. 12, 2020

Related U.S. Application Data

(60) Provisional application No. 62/855,737, filed on May 31, 2019, provisional application No. 62/843,938, filed on May 6, 2019.

(51) Int. Cl.
H04L 9/40          (2022.01)

(52) U.S. Cl.
CPC ...... *H04L 63/0876* (2013.01); *H04L 63/0428* (2013.01); *H04L 63/102* (2013.01); *H04L 63/108* (2013.01); *H04L 63/20* (2013.01)

(58) Field of Classification Search
CPC ............. H04L 63/0876; H04L 63/0428; H04L 63/102; H04L 63/108; H04L 63/20
See application file for complete search history.

(56) References Cited

U.S. PATENT DOCUMENTS 8,611,928 B1 *  12/2013  Bill ....................... H04W 48/04
                                                      455/414.3
2011/0237221 A1 *  9/2011  Prakash .................. H04W 4/70
                                                      455/410

(Continued)

*Primary Examiner* — Harris C Wang
(74) *Attorney, Agent, or Firm* — Invoke

(57) ABSTRACT

In some implementations, a controller device can implement communication restriction configurations on a managed device operated by a first user with a first account identifier, the configurations designed to limit a feature or functionality of the managed device. For example, the controller device can remotely cause the managed device to limit the communication capabilities of the first device. For example, the first device receives a message including the configuration. The managed device determines that the communication restriction configuration is created by a second user of the controller device. The first device identifies a second account identifier for the controller device. The first device determines that the second account identifier represents a member of a family group that includes the first account identifier. The managed device then automatically configures itself based on the first communication restriction configuration, including restricting access to one or more communication features of the managed device.

24 Claims, 11 Drawing Sheets

(56)                    References Cited

U.S. PATENT DOCUMENTS

| | | | |
|---|---|---|---|
| 2013/0017806 A1* | 1/2013 | Sprigg .................... | H04M 1/66 |
| | | | 455/411 |
| 2018/0048514 A1* | 2/2018 | Arunachalam ......... | H04L 63/20 |
| 2018/0337889 A1* | 11/2018 | Panchapakesan ......... | H04L 9/14 |
| 2021/0281481 A1* | 9/2021 | Richards ............. | H04L 41/0853 |

* cited by examiner

100

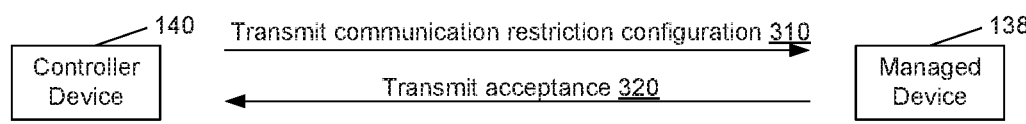
FIG. 3

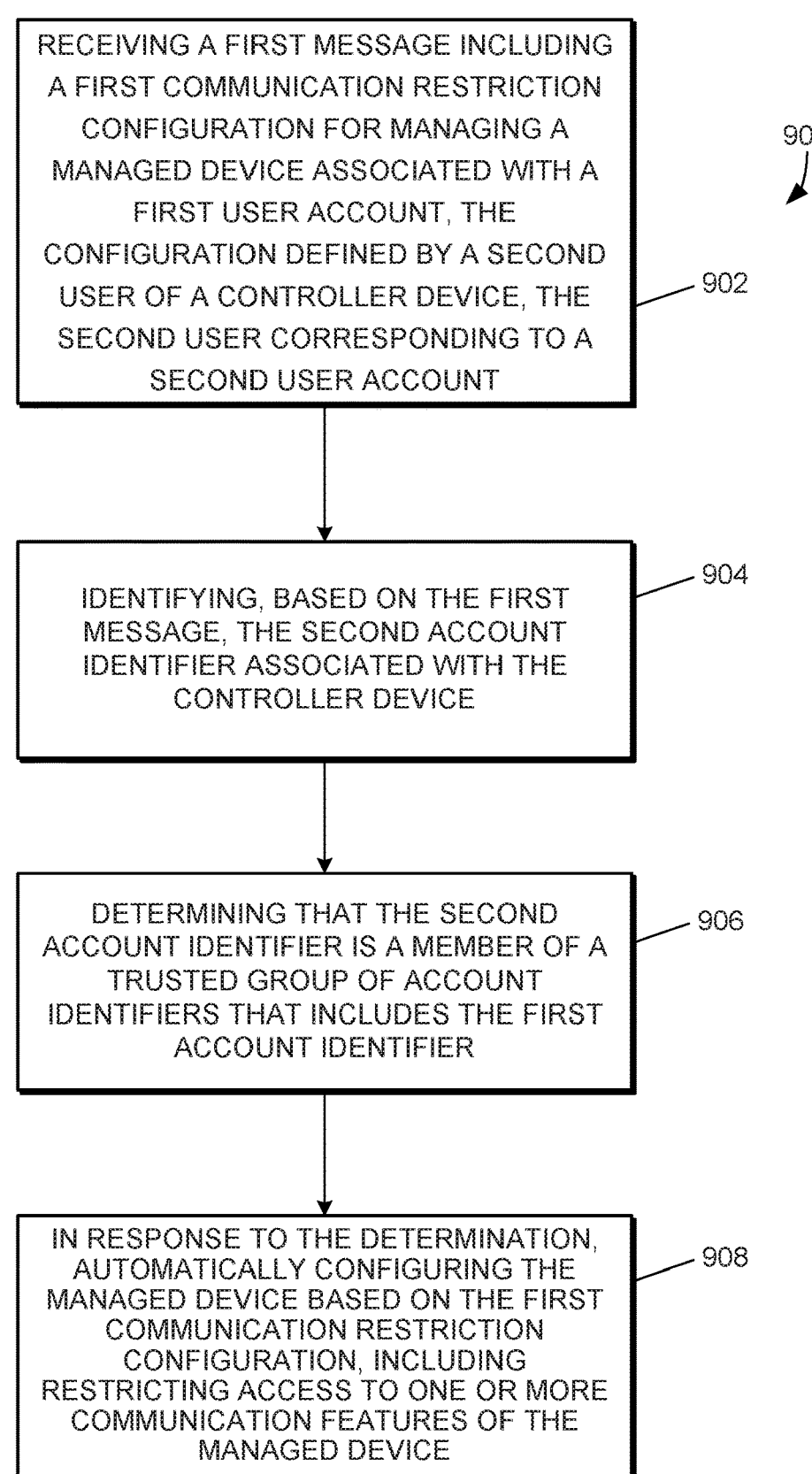

900

RECEIVING A FIRST MESSAGE INCLUDING A FIRST COMMUNICATION RESTRICTION CONFIGURATION FOR MANAGING A MANAGED DEVICE ASSOCIATED WITH A FIRST USER ACCOUNT, THE CONFIGURATION DEFINED BY A SECOND USER OF A CONTROLLER DEVICE, THE SECOND USER CORRESPONDING TO A SECOND USER ACCOUNT          902

IDENTIFYING, BASED ON THE FIRST MESSAGE, THE SECOND ACCOUNT IDENTIFIER ASSOCIATED WITH THE CONTROLLER DEVICE          904

DETERMINING THAT THE SECOND ACCOUNT IDENTIFIER IS A MEMBER OF A TRUSTED GROUP OF ACCOUNT IDENTIFIERS THAT INCLUDES THE FIRST ACCOUNT IDENTIFIER          906

IN RESPONSE TO THE DETERMINATION, AUTOMATICALLY CONFIGURING THE MANAGED DEVICE BASED ON THE FIRST COMMUNICATION RESTRICTION CONFIGURATION, INCLUDING RESTRICTING ACCESS TO ONE OR MORE COMMUNICATION FEATURES OF THE MANAGED DEVICE          908

FIG. 9

REMOTELY CONFIGURING COMMUNICATION RESTRICTIONS

RELATED APPLICATIONS

This application claims the benefit of the filing date of U.S. Provisional Patent Application No. 62/843,938, filed on May 6, 2019, and U.S. Provisional Patent Application No. 62/855,737, filed on May 31, 2019, which are incorporated herein by reference.

TECHNICAL FIELD

The disclosure generally relates to remotely configuring computing devices, and specifically to remotely configuring communication restrictions on a managed device.

BACKGROUND

Children today have access to sophisticated mobile computing devices that offer numerous capabilities, whose unsupervised use may cause their parents to be concerned about the children's productivity, safety, and privacy.

SUMMARY

In some implementations, a computing device can manage how another computing device will be used. For example, a first user may wish to limit a second user's ability to communicate on a computing device. An organization may wish to restrict an employee's ability to communicate with, for example, non-work contacts. Similarly, a parent may wish to use the parent's computing device to manage how the parent's children use their computing devices.

A controlling user and one or more managed users may also register their computing devices in a network of user accounts (e.g., an enterprise group or family group). For example, a parent's computing device (e.g., "controller device") and a child's device (e.g., "managed device") may be associated with particular permissions. The parent's controller device may be permitted to remotely configure and control the usage of the managed device(s) in the user account network without needing to physically access the managed device. The parent may specify limitations, permissions, or different policies that may govern the ability of the managed device to communicate with other devices, execute various application functionalities, run any particular software, and manage its own settings.

Particular implementations provide at least the following advantages. A controlling user in an organization (e.g., an enterprise IT department) can configure and restrict the devices of one or more employees without physically accessing those devices. Similarly, a parent can easily configure and restrict the child's device without first waiting to physically access it. Also, a parent can create communication restriction configurations for multiple devices without having to configure each device individually and even at times of low or no connectivity for the child's device. Particular implementations benefit the controlling user because the controlling user can restrict the contacts with whom a managed user can communicate. These implementations also improve security on the managed device, reduce the number of unnecessary, irrelevant, or risky communications (e.g., with spam callers, telemarketers, and other unknown or unauthorized users), and enable a managed user to make more productive use of the managed device with fewer distractions. Particular implementations are also advantageous because they enable the managed device to still perform certain functions while subject to communication restrictions. This improves usability of the device because the communication restrictions do not make the device completely unusable and important functions (e.g., important communications) can still proceed as normal.

Details of one or more implementations are set forth in the accompanying drawings and the description below. Other features, aspects, and potential advantages will be apparent from the description and drawings, and from the claims.

DESCRIPTION OF DRAWINGS

FIG. 3 is a system interaction diagram for an example system for remotely configuring communication restrictions without an intermediary device.

FIG. 9 is a flow diagram showing a process used by a managed device to determine whether a sender of communication restriction configurations is authorized to implement those configurations on the computing device.

Like reference symbols in the various drawings indicate like elements.

DETAILED DESCRIPTION

Figure 1:
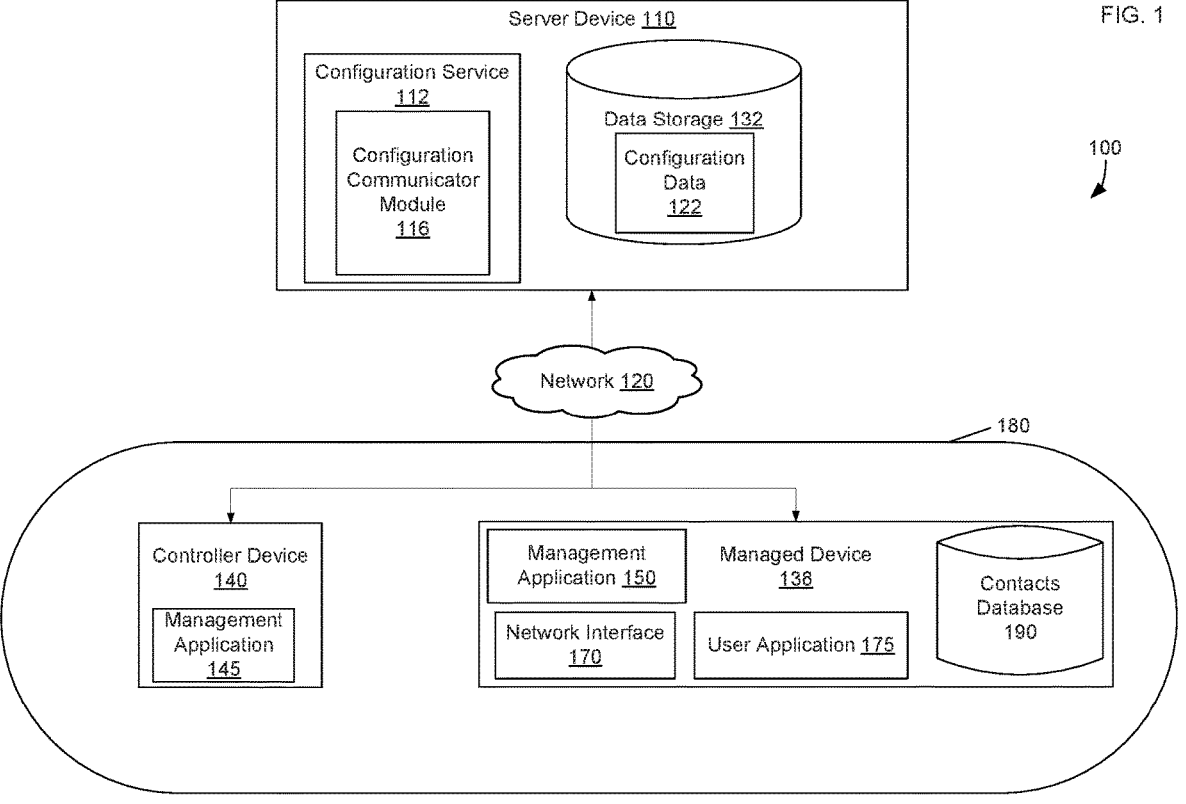
FIG. 1 is a block diagram of an example system for remotely configuring communication restrictions.

As summarized above, the disclosed systems and methods enable a person to remotely configure communication restrictions for another person's device. As used herein, "communication restrictions" may refer to particular configurations generated at a first device to be implemented on a second device to restrict functionality of the second device.

The communication restrictions may restrict communications with certain people or contacts while permitting communications with other people. For example, an employer, such as an organization, may provide an employee with a mobile computing device. The device may be configured with enterprise management settings created by the employer's information technology department. These enterprise management settings may limit the people that the employee can contact to a limited set of contacts (e.g., the employee's colleagues only). As another example, a parent may configure a child's device with communication restrictions. The parent may configure an approved contact list for the child's device. The communication restrictions may thus prohibit any communications to or from the child's device that involve a contact that is not on the approved contact list.

The communication restrictions may restrict communication functionality based on time. For example, the parent may restrict the child's ability to communicate with a particular contact after a certain time of day. Similarly, the communication restrictions may restrict particular types or forms of communication restrictions. For example, a child's device may have installed multiple communication applications that enable video, audio, and text communications. A parent may configure communication restrictions on the child's device that disable, for example, all applications that enable video communications while still permitting applications that enable only audio communication.

The communication restrictions may restrict particular features of a communication application while still permitting other features to operate. For example, a child's device may have installed a communication application that enables both video and audio communications. A parent may configure communication restrictions on the child's device that disable, for example, video communication functionality of the application while still permitting audio communication functionality of the application.

The communication restrictions may affect the ability of the second device to send, receive, or view communications in other ways. For example, an employer may provide an employee with a mobile computing device. The employer may wish to see a record of all communications made using the mobile computing device. The employer may configure communication restrictions on the employee's mobile computing device that disable an ability to delete logs or records of communications made using the mobile computing device. The communication restrictions may be a combination of two or more of the restriction types described above.

As an example, a parent may use the parent's device (referred to herein as "controller device") to remotely configure the child's device (referred to herein as "managed device"). In some embodiments, a parent may control the contacts with which a child can communicate. The parent may also include additional restrictions or other settings, such as permitted communication types and limits on communication times. The parent may also configure application usage on the child's device. For example, the parent may remotely configure the applications that a child is permitted to install (or uninstall) on the managed device. The parent may limit application use times to certain periods. The parent may limit what applications a child can use to communicate with others, for example.

FIG. 1 is a block diagram of an example system 100 for remotely configuring communication restrictions on managed devices. For example, a parent may use controller device 140 to manage a child's use of managed device 138. For example, system 100 can be a communication restriction configuration system that provides an operator (e.g., parent or other authorized family member) of controller device 140 the ability to remotely configure and manage the use managed device 138 (e.g., associated with children or other family members) through network 120 (e.g., a local area network, wide area network, the Internet, etc.) and/or server device 110. In some embodiments, controller device 140 generates remotely configuring communication restrictions.

In some embodiments, the parent uses controller device 140 to send these configurations via server 110 to managed device 138 to be configured on the managed devices. In some embodiments, controller device 140 sends these configurations directly to managed device 138 directly through a peer to peer connection (e.g., Bluetooth, peer-to-peer Wi-Fi, etc.) or through some other network connection that does not include server 110. The configuration(s) may remotely cause changes to the default configuration of the managed device. For example, the configuration may restrict, update, or disable certain features of the managed device.

The expected location configurations that may be specified by a user, (e.g., configurations based on time, geolocation, device environment/condition, etc.), as well as any communications corresponding to those configurations, may be encrypted in an end-to-end encrypted manner as described herein. In this way, the configuration data is only accessible by the devices associated with the user (e.g., and/or children) and not by a server (e.g., server 110), thereby protecting user privacy.

Referring to FIG. 1, in some embodiments, system 100 can include controller device 140 and managed device 138. Any of controller device 140 and managed device 138 can be a laptop computer, desktop computer, smartphone, tablet computer, wearable device (e.g., smartwatch), or any other computing device.

In some embodiments, each device in a family (e.g., controller device 140, managed device 138) may be registered within a group of devices (e.g., a family group) that are associated with each other. For example, each device may be associated with a different user account and each user account can be associated with a family group. A family of users (e.g., two parents and their children) may each have a particular user account, for example. The family's user accounts may be associated together in a user account family or user account network. The associations between user accounts may be further defined. For example, when purchasing or activating the devices, a parent or guardian may configure one account as a parent account that can configure or control how the other accounts are used. Similarly, the parent account may be given authorization to control use of any child accounts through the communication restriction mechanisms described herein. The parent account may be authorized so that any device associated with the parent account can change functionality of any managed device or any device associated with an account registered to the parent's children.

In other words, a parent may configure a computing device for the parent's personal use and as a controller device. The parent may configure the other devices as managed devices that are subsidiary to the controller device in that the managed devices accept remotely generated configurations that affect usage of the managed device. Additionally, the described parental control configurations may be applied to any managed device, not just one operated by a child. For example, a person may wish to apply similar configurations to the managed device of an older user, a user with a disability, or anyone with a limited ability to productively or responsibly use a mobile device without causing device errors or inconveniences to the user. For example, a person may use controller device 140 to implement a communication restriction on managed device 138 operated by an elderly user (e.g., an elderly parent). The person may wish to ensure that the elderly user's preferred device settings remain in place and are not altered by accidental modifications or by some other user.

Similarly, an employer may configure communication restrictions for an employee. For example, an employer may use controller device 140 to configure communication restrictions on the employee's managed device 138. For example, the employer may restrict who the employer can contact using managed device 138 by enforcing an approved contact list.

FIG. 1 shows controller device 140 and managed device 138. In some embodiments, each of controller device 140 and managed device 138 are included within a family of associated devices as described above. Accordingly, FIG. 1 shows controller device 140 and managed device 138 in a family group 180. In other embodiments, these devices are not associated as devices, but the accounts used to log in to and personalize each device are associated together as a family of user accounts as described above.

In some embodiments, a parent creates a communication restriction configuration at controller device 140 (e.g., using management application 145). The communication restriction configuration can include a variety of restrictions, settings, and particular specifications. Any of these restrictions, settings, and specifications may alter one or more default behaviors or capabilities of a managed device. For example, a parent may desire to restrict a child's managed device from communicating with any other device. As another example, a parent may create a setting that limits a social media application on the child's managed device to being active or usable for only one hour a day. As yet another example, the parent may specify a list of the only contacts with whom the child is approved to communicate. In some embodiments, the communication restriction configuration is a data structure or structured data object that is designed to be interpreted and implemented by a managed device.

Management application 145 of controller device 140 may compile each of the parent's specified settings into a data structure that represents the complete communication restriction configuration. Each setting or specification may be a discrete data point that is configured so that a managed device can receive the communication restriction configuration and implement each setting. In some embodiments, a managed device can receive the communication restriction configuration, evaluate the contents, and implement each restriction or setting according to the parent's configuration. For example, the managed device may identify an approved contact list specified by the parent and restrict communications to only contacts on the approved contact list.

The parent may then transmit the generated communication restriction configuration from controller device 140 to, for example, managed device 138 being used by one of the parent's children. The child may use management application 150 on managed device 138 to review the communication restriction configuration and understand details of the communication restrictions (e.g., approved contact lists, communication limitations, changes to application behaviors and use, etc).

In some embodiments, system 100 can include server device 110 that includes configuration service 112 and data storage 132. Configuration service 112 includes configuration communicator module 116. Data storage 132 includes configuration data 122.

In one embodiment, controller device 140 transmits communication restriction configurations to server device 110 for implementation on, for example, managed device 138. For example, a parent may use controller device 140 to create a communication restriction configuration affecting managed device 138 that is used by the parent's child. In one embodiment, controller device 140 may be configured to encrypt the communication restriction configuration and transmit it to server device 110 along with an identifier of, for example, the child's managed device 138. Server device 110 may then transmit the encrypted communication restriction configuration to managed device 138. Managed device 138 may be configured to decrypt the received communication restriction configuration and apply the settings specified therein on managed device 138.

In some embodiments, server device 110 cannot decrypt or access the contents of any communication restriction configuration. For example, while managed device 138 may have the keys necessary to decrypt the encrypted communication restriction configurations, server device 110 may not have the encryption keys necessary to decrypt the encrypted communication restriction configurations. However, in some embodiments, server device 110 may be configured to store communication restriction configurations in association with an identifier for controller device 140 and managed device 138. For example, server device 110 may store identifiers for the user account family that includes users of controller device 140 and managed device 138. When a new device is associated with an account identifier, server device 110 may be configured to search stored user accounts and user account families. Server device 110 may then be configured to identify whether the new device is associated with a user account that belongs to a particular user account family. Server device 110 may be configured to identify if there is a user (e.g., a parent) in that user account family that is authorized to create communication restriction configurations. If server device 110 finds a user that is so authorized, server device 110 may be configured to notify a controller device (e.g., controller device 140) of that user and invite the user to provide communication restriction configurations. Server device 110 may additionally or alternatively provide existing communication restriction configurations to the user with a suggestion to implement one or more of these onto the newly activated device.

In some embodiments, server device 110 can automatically send the stored communication restriction configuration associated with the user account identifier to the new device associated with the user account identifier (e.g., associated with a child) when the new device is detected. The new device can then apply the communication restriction configuration settings on the new device, as appropriate. For example, since different devices have different capabilities, some of the communication restriction configuration settings specified for a previous device may not be applicable to the new device that may have different capabilities than the previous device. The new device can apply the communication restriction settings that are relevant to the new device's capabilities while ignoring settings for capabilities and/or features that are not supported by the new device.

In one embodiment, controller device 140 and managed device 138 use an encrypted messaging service to communicate with each other whereby server device 110 cannot decrypt or access the contents of any message exchanged between controller device 140 and managed device 138. In another embodiment, controller device 140 and managed device 138 exchange encryption keys using a peer-to-peer communication link that does not involve server device 110. For example, a parent may use a peer-to-peer communication link to exchange encryption keys between the parent's controller device 140 and managed device 138. In this embodiment, controller device 140 and managed device 138 may not use a messaging service that provides encryption but may use separate encryption and decryption capabilities on the devices to secure messages that are sent via server device 110.

In some embodiments, controller device 140 can configure a managed device (e.g., managed device 138) with contacts data. For example, the parent may specify which contacts (e.g., friends, family, acquaintances, or other people with which the child comes into contact) with which the managed device may communicate. The parent may flag certain contacts as approved contacts with which the child may communicate. In addition, the parent may flag certain contacts as approved for communication at certain times but not at other times.

In some embodiments, the parent sends the approved contact list using controller device 140 to managed device 138 (e.g., via server device 110). The parent may also specify certain contact methods permitted for each contact. For example, the parent may specify that a child can communicate with a certain contact by text message but not by telephone. The parent may also specify limited hours during which the child may communicate with the contact. Managed device 138 may be configured to store the approved contact list in contacts database 190. Managed device 138 may be configured to store each approved contact in contacts database 190 with, for example, the name of the contact or other identifiers, permitted methods for contacting the contact, and any specified communication time limits. Managed device 138 may be configured to prevent any communication from a person that is not on the approved contact list. For example, managed device 138 may compare the source of each incoming communication with the approved contact list. Managed device 138 may be configured to permit the communication only if all attributes of the communication source match all attributes of a contact on the approved contact list.

In some embodiments, a child can attempt the addition of or modification to contacts database 190. For example, the child may make a new friend and wish to add contact information for the new friend to managed device 138. When managed device 138 receives input from the child to add the new friend, managed device 138 may evaluate the input against any enforced communication restriction configurations. For example, a parent may have enforced an approved contact list for the child so that any person not appearing on the approved contact list may not be added as a contact. In such a case, managed device 138 evaluates whether the new friend appears on the approved contact list and provides an approval or denial message to the child.

Managed device 138 may also be configured to forward the child's request to controller device 140 (e.g., a parent device). For example, managed device 138 may transmit the new contact's name or other identifiers, communication identifiers (e.g., telephone number, email address etc.), and/or a user account identifier.

The parent may receive the new contact request at controller device 140 and determine whether to approve it. For example, the parent may review the request and determine that it should be denied and the child should not be allowed to contact the new friend using managed device 138. Accordingly, controller device 140 may transmit a complete denial message to managed device 138. As another example, the parent may determine that the request should be approved and the child can contact the new friend using managed device 138 with no restrictions. Accordingly, controller device 140 may transmit an approval message to managed device 138. As yet another example, the parent may determine that the child should be allowed to communicate with the contact under certain conditions. Accordingly, the parent may generate a new communication restriction configuration for the new friend and transmit that to managed device 138. The communication restriction configuration may represent an approval with conditions. For example, the communication restriction configuration may enable managed device 138 to allow telephone calls with the new friend but not video calls. If the contact is approved, managed device 138 may add the new contact to contact's database 190 along with any specified conditions.

Configuration communicator module 116 is configured to receive communication restriction configurations from controller device 140 and transmit them to the targeted managed device (e.g., managed device 138). In some embodiments, configuration communicator module 116 receives data transmissions or messages from controller device 140 that include communication restriction configurations and identifiers for the targeted managed device. In some embodiments, controller device 140 encrypts the communication restriction configurations but not the managed device identifier so that configuration communicator module 116 is able to transmit the communication restriction configurations to the correct target device.

Data storage 132 includes configuration data 122. Where server device 110 loses network connectivity via network 120 to, for example, managed device 138, configuration data 122 may cache a communication restriction configuration received from controller device 140. Configuration data 122 may store or cache the communication restriction configuration until network connectivity is reestablished between server device 110 and managed device 138. Configuration data 122 may also store associations between managed device 138 and controller device 140 (e.g., the associations defined by family group 180). Configuration data 122 may store a group of user account identifiers as a user account family. Configuration data 122 may also store a mapping between user account identifiers and device identifiers. For example, one user may have multiple devices. When controller device 140 transmits a communication restriction configuration to server device 110, controller device 140 can include a user account identifier. Server device 110 may be configured to transmit the communication restriction configuration to all devices of the targeted user using the mapping stored in configuration data 122. As described earlier, contents of the communication restriction configuration and any other communication between controller device 140 and managed device 138 that routes through server device 110 may be end-to-end encrypted.

In some implementations, managed device 138 can include management application 150, network interface 170, and user application 175. User application 175 is an example of an application that can be managed using a communication restriction configuration generated at controller device 140. The systems and methods described herein are applicable to managed device 138 as a whole and so the communication restriction configurations described herein are applicable to any application, feature, functionality, tool, or other software or hardware component of managed device 138.

In yet another embodiment, the communication restriction configurations are designed to directly impact applications or functionality at the managed device without the presence of a management application. For example, a parent or guardian may generate a communication restriction configuration at controller device 140 using management application 145. The generated communication restriction configuration may be designed to directly limit the functionality of user application 175. In one embodiment, the configuration may function as a service or operating system code that, for example, inhibits the ability of user application 175 to connect to network interface 170. In this embodiment, the communication restriction configuration may not require a management application to execute on managed device 138 in order to configure it or may generate a communication restriction configuration that directly affects a functionality of managed device 138 without involving an installed management application.

As described above, a user account identifier (e.g., a child) associated with managed device 138 and a user account identifier (e.g., a parent) associated with controller device 140 may be included in family group 180. Each of managed device 138 and controller device 140 may store the same data for family group 180. More specifically, managed device 138 and controller device 140 may store data regarding certain relationships or associations between each other. In one embodiment, family group 180 may be defined such that controller device 140 can be used to implement communication restriction configurations on managed device 138. More specifically, a communication restriction configuration may be applied to various components of managed device 138. For example, a communication restriction configuration may affect the installation, use, or feature activation of user application 175. A communication restriction configuration may limit the ability of network interface 170 of managed device 138 to send and receive communications or user inputs and outputs.

In some embodiments, managed device 138 can receive communication restriction configuration from controller device 140. For example, managed device 138 can receive a data message including a communication restriction configuration for managing managed device 138 from controller device 140. The communication restriction configuration may be defined by a user of controller device 140. As described above, a parent may implement communication restriction configurations for a child's managed device. Managed device 138 is configured to identify, based on the data message, the originating device that transmitted the communication restriction configuration. This may be, for example, controller device 140. Having identified controller device 140, managed device 138 may determine an account identifier of a user of controller device 140. In another embodiment, managed device 138 may retrieve an account identifier that is transmitted with the communication restriction configuration. For example, server device 110 may transmit the communication restriction configuration and an account identifier for the user that created the communication restriction configuration.

Managed device 138 may be configured to determine that the account identifier is a member of a family group of account identifiers. For example, managed device 138 may recognize the account identifier of a parent. As another example, managed device 138 may recognize the account identifier to belong to a family group of account identifiers (e.g., a family of users) that also includes the user account identifier currently being used at managed device 138. As yet another example, in response to receiving a communication restriction configuration, managed device 138 may provide server with the account identifier associated with the communication restriction configuration. Managed device 138 may request that server device 110 verify that the account identifier is for a person that is authorized to create communication restriction configurations for managed device 138.

In response to determining that the account identifier associated with the received communication restriction configuration is authorized, managed device 138 is configured to automatically apply the communication restriction configuration. As described above, the communication restriction configuration may be a data object that comprises each distinct restriction, setting, or specification defined by the parent at controller device 140. Managed device 138 evaluates the contents of the received communication restriction configuration. Managed device 138 may, for example, extract an approved contacts list. Managed device 138 may modify a communications application such that the communications application can only communicate with contacts from the approved contacts list. As another example, managed device 138 may parse the communication restriction configuration and identify a usage time limit for a social media application. Managed device 138 may be configured to disable the social media application once the usage time limit is reached.

Figure 2:
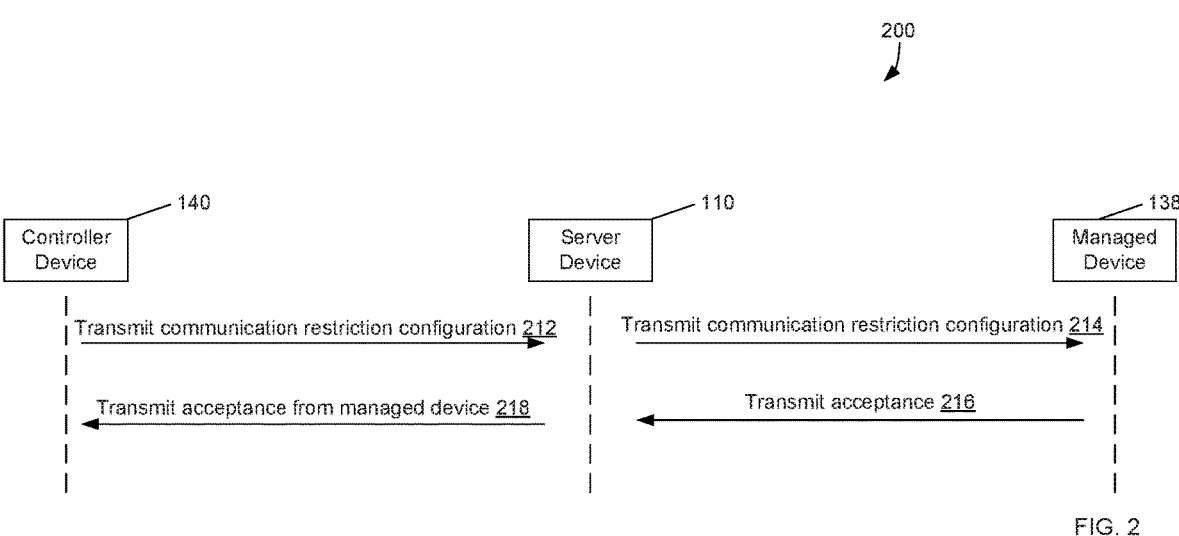
FIG. 2 is a system interaction diagram showing a controller device transmitting remotely configured communication restrictions for managed devices.

FIG. 2 is a system interaction diagram 200 for an example system for remotely configuring communication restrictions on managed devices.

As shown, FIG. 2 shows controller device 140, server device 110, and managed device 138 in interaction with each other. In some embodiments, controller device 140 transmits communication restriction configuration(s) to server device 110 at stage 212. For example, a parent may use controller device 140 to create and transmit communication restriction configurations aimed at managing a child's managed device 138. As described above, controller device 140 encrypts communication restriction configuration before transmitting to server device 110. Moreover, controller device 140 also transmits one or more identifiers for a target managed device to server device 110. In some embodiments, controller device 140 is authenticated against server device 110 to ensure that controller device 140 can communicate with server device 110. For example, controller device 140 transmits user account identifiers or other account credentials for a parent.

In some embodiments, server device 110 evaluates the account identifiers and determines whether the user (e.g., the user associated with the transmitted account identifiers) of controller device 140 is authorized to transmit communication restriction configurations. Server device 110 also receives identifiers for the target device to be managed using the communication restriction configuration. Server device 110 may also evaluate whether the user of controller device 140 is authorized to implement communication restriction configurations on the particular managed device that has been identified as a target. In some embodiments, server device 110 receives an account identifier for a user of controller device 140 along with the communication restriction configuration. In another embodiment, server device 110 determines the account identifier by looking it up using a device identifier for controller device 140 that is received with the communication restriction configuration.

In some embodiments, server device 110 determines whether the account identifier is for an account that is permitted to create communication restriction configurations. If so, server device 110 retrieves a family group identifier that corresponds to the account identifier. For example, a parent named "John Smith" may have an associated family group called "Smith". Server device 110 retrieves the family group identifier and determines whether the targeted managed device is within the identified family group. If the target is within the family group, server device 110 may determine whether that managed device is configured to receive communication restriction configurations (and also if the managed device is configured to receive these from the account identifier for controller device 140 or from a different account identifier). Once server device 110 confirms that the account identifier for controller device 140 is authorized to implement communication restriction configurations for the targeted managed device, server device 110 may forward the communication restriction configurations to the target (e.g., managed device 138).

Server device 110 transmits the communication restriction configuration received from controller device 140 to managed device 138 at stage 214. In some embodiments, server device 110 also transmits the account identifiers or device identifiers received in conjunction with the communication restriction configuration to managed device 138.

Managed device 138 is configured to receive the communication restriction configuration and determine whether to apply the settings specified therein on managed device 138. In some embodiments, managed device 138 is configured to evaluate the account identifiers or device identifiers received from server device 110. In addition, managed device 138 may be configured to evaluate one or more identifiers received for server device 110. In some embodiments, managed device 138 determines that the account identifier received with the communication restriction configuration for the user of controller device 140 is authorized. For example, controller device 140 is operated by a parent who sends communication restriction configurations via server device 110 to a child's managed device 138. The managed device 138 determines that the communication restriction configuration originated from the parent or from the device of the parent and considers the communication restriction configuration authentic and applicable to the managed device 138. Accordingly, managed device 138 transmits acceptance of the communication restriction configuration at stage 216. At stage 218, server device 110 transmits the acceptance from managed device 138 to controller device 140. The acceptance transmission confirms, for controller device 140, that the communication restriction configuration transmitted earlier at stage 212 is being implemented on managed device 138.

In some embodiments, the parent may create different communication restriction configurations based on the age of the child. The parent may define one or more age brackets for her child and define communication restrictions according to each age bracket. As an example, the parent may create a "0-13 years" communication restriction configuration for a child that is age 0 up to and including age 13 years. The communication restriction configuration for this age bracket may specify, for example, that the child cannot use any social media applications. The parent may create a "13-16 years" age bracket for a child that is over age 13 up to and including age 16 years. The communication restriction configuration for this age bracket may specify, for example, that the child can use social media applications but can only communicate with certain contacts (such as the contacts in the approved contact list defined by the parent). The parent may create a "16-18 years" age bracket for a child that is over age 16 up to and including age 18. The communication restriction configuration for this age bracket may specify, for example, that the child can use social media applications without any restrictions.

FIG. 3 is a system interaction diagram 300 for an example system for remotely configuring communication restrictions without an intermediary device. As shown, controller device

140 and managed device 138 interact with each other to establish communication restriction configurations for managed device 138.

At stage 310, controller device 140 transmits communication restriction configurations directly to managed device 138. In contrast to the embodiments described with respect to FIG. 2, controller device 140 does not communicate with managed device 138 via server device 110 or another intermediary device. In some embodiments, controller device 140 establishes a direct connection with managed device 138 in order to transmit communication restriction configurations. For example, controller device 140 may initiate a peer-to-peer connection with managed device 138. Controller device 140 may be in physical proximity with managed device 138 and establish a proximity-based connection with managed device 138.

In some embodiments, controller device 140 establishes a pairing connection with managed device 138. Controller device 140 may be configured to pair with multiple managed devices. For example, a parent may use a controller device and one or more managed devices of her own. On the controller device, the parent may switch to viewing displays or user interfaces of one of her managed devices. For example, a parent may use a smartphone to switch to viewing interfaces of a smartwatch that is paired with the smartphone. In some embodiments, controller device 140 may be configured to pair with a managed device that is used by the child (e.g., used with the child's user account). So the parent may be able to switch to a managed device being used with the child's user account just like the parent is able to switch to a managed device being used with the parent's user account. Managed device 138 receives the communication restriction configuration and transmits acceptance at stage 320.

Figure 4:
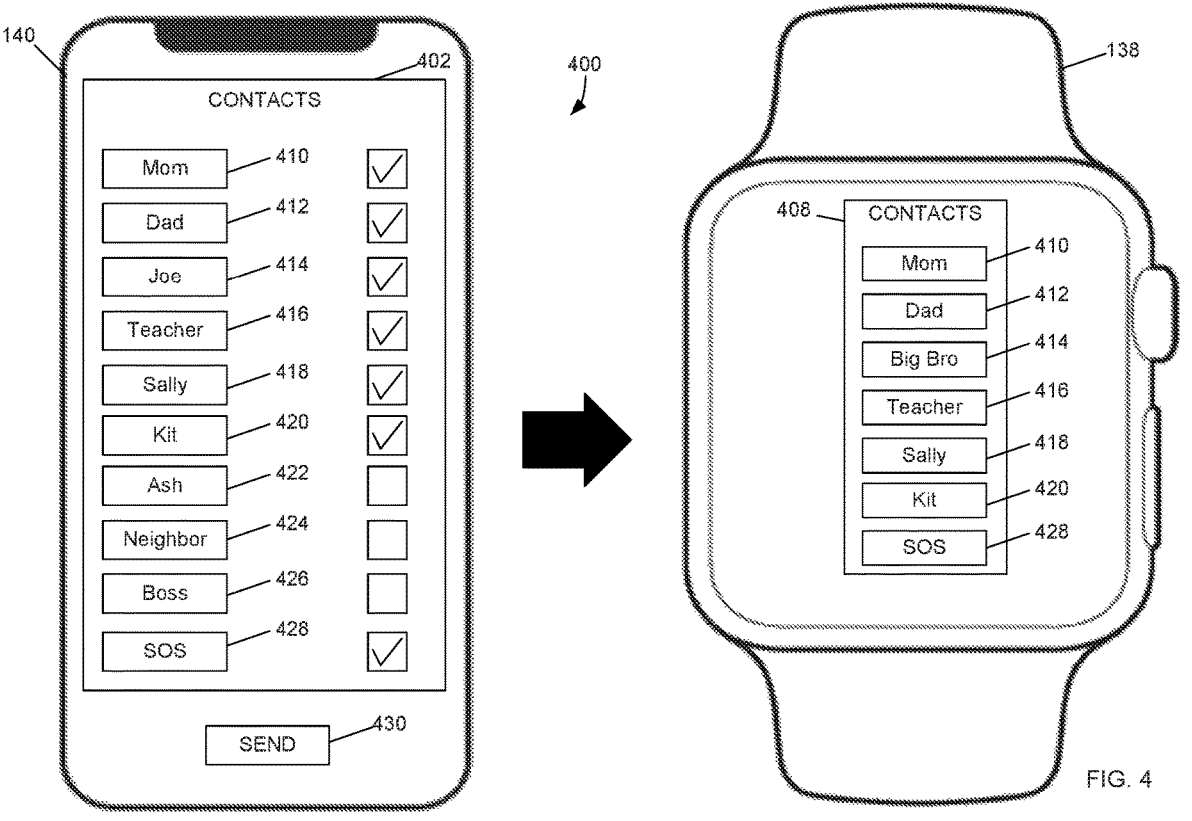
FIG. 4 shows user interfaces for a controller device and a managed device after the controller device remotely configures certain communication restrictions on the managed device.

FIG. 4 shows user interface 402 for a controller device and user interface 408 for a managed device after the controller device remotely configures certain communication restrictions on the managed device. FIG. 4 depicts controller device 140 as a smartphone-type mobile computing device and managed device 138 as a smartwatch-type wearable computing device. However, the systems and methods described herein may be applicable to any computing device on any hardware platform or form factor. For example, a parent may use controller device 140 to configure a child's managed device 138, as described above. In the example illustrated in FIG. 4, a parent may configure a child's device to limit the contacts with which a child can communicate. A parent can interact with similar user interfaces to allow or disallow use of specific applications and/or other features of managed device 138. A parent may use interfaces similar to those illustrated in FIG. 4 to remotely control, for example, display/sound controls, battery management, connections methods of managed device 138 such as Wi-Fi or Bluetooth, or the like.

In FIG. 4, controller device 140 (similar to controller device 140, shown in FIG. 1) displays a contacts list 402 that includes a number of contacts. Contacts list 402 may include the parent's contacts only. In other embodiments, contacts list may display contacts of the child. For example, the parent may remotely view the contact's application on the child's managed device 138 and configure communication restrictions pertaining to those contacts. In still other embodiments, contacts list 402 may be configured to show a combination of both the parent's contacts from controller device 140 and the child's contacts from managed device 138. In some embodiments, the child's device may have no contacts (e.g., on a newly activated device) and the parent may wish to transfer some of the parent's contacts to the child's device and limit the child's communication to the transferred contacts only. As shown, contacts list 402 includes parent contact 410, parent contact 412, sibling contact 414, teacher contact 416, friend contact 418, friend contact 420, friend contact 422, neighbor contact 424, boss contact 426, and emergency contact 428.

In some embodiments, the parent may configure a contact list for a child's newly activated device. The new device may have no contacts saved to it initially. Accordingly, the parent may select contacts from the parent's contact list (e.g., contact list 402) to transfer to the child. In some embodiments, controller device 140 may belong to one of the people (e.g., the configuring parent) identified by parent contact 410 or parent contact 412. Sibling contact 414 may refer to an older sibling of the child that will use managed device 138. Teacher contact 416 may refer to a schoolteacher of the child using managed device 138. Friend contacts 418, 420, and 422 may refer to friends of the child whose contact information the parent has received through some out-of-band method (e.g., verbally from the child). Neighbor contact 424 may refer to the parent's neighbor. Boss contact 426 may refer to the parent's work supervisor. Emergency contact 428 may be configured in one of at least two different ways. In one embodiment, emergency contact 428 may be associated with one or more emergency contacts of the child. For example, if the child initiates a communication using emergency contact 428, each emergency contact will be contacted (e.g., the child's mother, the child's mother and the child's father, the child's parents and an older sibling, or the like). In another embodiment, emergency contact 428 may be associated with local emergency response authorities or be used to dial 911.

In some embodiments, communication restrictions may be suspended according to certain rules relating to contacts with emergency services or emergency contacts. For example, managed device 138 may be configured to suspend communication restrictions for a certain period of time (e.g., for 24 hours) after a contact (e.g., a call or text message) is made to an emergency service contact (e.g., 911). As another example, communication restrictions may be suspended or removed for the duration of time that managed device 138 is in an emergency contact mode (e.g., an SOS mode).

In some embodiments, managed device 138 is configured to disallow non-contact emergency personnel from contacting the child while communication restrictions prevent contact from non-contacts. In certain scenarios, inbound contacts to managed device 138 from emergency personnel may not originate from recognized emergency service numbers (such as 911). Instead, they may originate from normally formatted numbers that are indistinguishable from civilian numbers. As a result, managed device 138 may be configured to require that the child first place an outbound call to a recognized emergency service (e.g., 911) before all communication restrictions are lifted on managed device 138. Managed device 138 may be configured to then remove communication restrictions for a certain period of time (e.g., 24 hours) after a recognized emergency service number is contacted (e.g., via call or text).

In some embodiments, the parent is able to use the controller device 140 to select contacts from contact list 402 and transmit the selected contacts to a child's managed device 138 as part of a communication restriction configuration. The communication restriction configuration may cause managed device 138 to make certain automatic changes to the contacts as they are added to managed device 138. In one embodiment, the communication restriction configuration may cause managed device 138 to automatically change a relationship type associated with a contact that controller device 138 transmits to managed device 138. For example, a parent using controller device 140 may transmit her sister's contact to her child's managed device 138. The sister's contact may of relationship type "sister" on controller device 140. But when the contact is transmitted to managed device 138, the communication restriction configuration may cause managed device 138 to automatically change the relationship type to, for example, "aunt".

In one embodiment, the communication restriction configuration causes managed device 138 to be restricted so that only the selected contacts can be communicated with. In another embodiment, the communication restriction configuration causes managed device 138 to be restricted to only a certain count of contacts.

As shown in FIG. 4, the parent selects parent contact 410, parent contact 412, sibling contact 414, teacher contact 416, friend contact 418, friend contact 420, and emergency contact 428 (e.g., using selection boxes displayed adjacent to the contacts in contact list 402). For example, the parent may select these particular contacts because they are relevant to the child and the parent considers each of these individuals as safe or appropriate contacts with whom the child can communicate. The parent may not select the parent's neighbor or work supervisor because those contacts are irrelevant, unnecessary, or inappropriate for the child. In addition, the parent may not select friend contact 422 even though it represents a friend of the child because the parent may not consider friend contact 422 a suitable contact for the child to communicate with.

Once the parent has selected the desired contacts on controller device 140, the parent transmits the contacts to the child's managed device 138. In some embodiments, the parent may use an interaction control such as button 430 to send the contacts to managed device 138. In other embodiments, the parent may proceed to other communication restriction configuration screens on controller device 140 to generate other configurations for managed device 138.

In some embodiments, the communication restriction configuration may comprise only a list of selected contacts. In other embodiments, the communication restriction configuration may include other contacts-related controls. The contacts-related controls may include particular times at which communicating with the selected contacts is authorized by the parent. Contacts-related controls may include contact editing limitations. For example, the contacts-related controls may allow the child to make certain contact changes such as add a photo to a contact entry or re-name a contact entry (e.g., change sibling contact 414 from "Joe" to "Big Bro") but may restrict other changes, such as updating or changing a contact's phone number.

In some embodiments, the communication restriction configuration described above with respect to FIG. 4 may also include a restriction on the ability of managed device 138 to contact anyone apart from the selected contacts. For example, the communication restriction configuration may disable or restrict the ability of managed device 138 to dial a phone number not included in the parent approved contacts list. The communication restriction configuration may restrict the ability of managed device 138 to receive any phone calls that do not originate from one of the specified contacts on the contact list.

The communication restriction configuration may restrict the ability of managed device 138 to generate text messages or receive text messages with contacts that do not appear on the approved contact list. For example, the child may attempt to enter a telephone number or account identifier to initiate a new text message. Managed device 138 may evaluate the entered identifier information and disable the conversation if managed device 138 determines that the contact is not on the approved contact list. In other embodiments, the communication restriction configuration may cause managed device 138 to remove any interactive controls in a text messaging application that can be used to initiate a new conversation.

Similarly, the communication restriction configuration may restrict the ability of the managed device 138 to continue active text messaging conversations that include a contact that is not on the contact list. For example, a child may be participating in a text message conversation with one or more contacts. Often, a text message conversation may span several days including the current day. At some point in the day, the parent may transmit a communication restriction configuration that includes an approved contact list as described above. However, one or more contacts in the child's text message conversation may not appear on the approved contact list. Managed device 138 may be configured to evaluate all active text messaging conversations or threads and disable any conversations that include a contact that does not appear on the approved contact list.

As shown in FIG. 4, managed device 138 displays contact list 408 which comprises the specified contacts received from controller device 140. For example, once the parent transmits a communication restriction configuration, the child's managed device 138 displays the results of the implementation of the communication restriction configuration. Accordingly, contact list 408 of managed device 138 includes parent contact 410, parent contact 412, sibling contact 414, teacher contact 416, friend contact 418, friend contact 420, and emergency contact 428.

Managed device 138 may provide the ability to modify contacts by default, but the communication restriction configuration transmitted from controller device 140 may act to disable contact modification features. As a result, contact list 408 may be a read-only list. For example, managed device 138 may display contact list 408. A child may attempt to select a contact from the list and expect to see a menu or controls to view and modify contact details. However, the communication restriction configuration may modify managed device 138 such that selecting a contact in contact list 408 may result in no change to the display or no menu that appears for a user to be able to change contact details. Similarly, a contact deletion control that is normally available to delete a contact may be disabled or hidden as a result of the communication restriction configuration.

Figure 5:
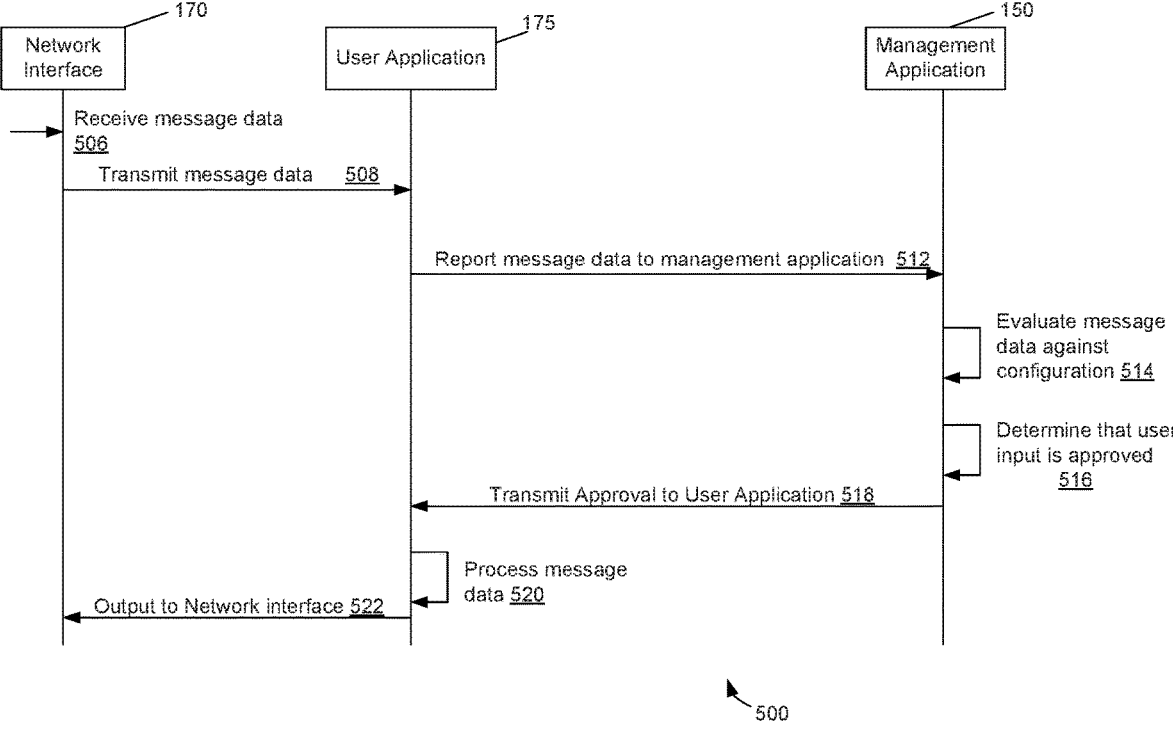
FIG. 5 is a system interaction diagram showing a management application of a managed device approving execution of an application function that is configured by a communication restriction configuration.

FIG. 5 is a system interaction diagram showing a management application of a managed device approving execution of an application function that is configured by a communication restriction configuration.

As shown in FIG. 5, system interaction diagram 500 depicts network interface 170, user application 175, and management application 150 of managed device 138. FIG. 5 shows an example of how managed device 138 implements a communication restriction configuration received from, for example, controller device 140 shown in FIG. 1. FIG. 5 illustrates the configuration implementation with respect to a communication application, but it is to be understood that the communication restriction configurations described herein may be applicable to any feature or capability of managed device 138.

Network interface 170 of managed device 138 receives message data, at step 506. For example, network interface 170 will receive message data relating to a message received at managed device 138 from another device. More specifically, network interface 170 may receive communication inputs from the other device indicating that a new message is received for managed device 138. As another example, network interface 170 may receive output data indicating that a user of managed device 138 is transmitting a message to another device. More specifically, network interface 170 may be configured to process data such as touch inputs, display outputs, voice inputs, speaker outputs, application processes that result in outputs to the device user, and the like. For example, a child may use managed device 138 to select a contact from a contact list. As another example, a child may use managed device 138 and select an application icon on a touch-sensitive display screen of managed device 138. As yet another example, managed device 138 may receive communications from another device or receive application data for an application (e.g., online gaming applications may transmit data between devices to facilitate online game play).

At step 508, network interface 170 may transmit the received message data to user application 175. In some embodiments, user application 175 is configured to transmit the message data at step 512 without performing any additional processing to management application 150. For example, a child may use managed device 138 to enter a contact's information and attempt to initiate a text conversation involving the contact. Accordingly, the message data may include communication input indicating the contact, type of application, means of communication, time information, or the like. By default, a user application such as user application 175 may be configured to process the message data and perform various functions. For example, the user application may display an interface showing text communications. However, the implementation of the communication restriction configuration causes user application 175 to simply forward the message data to management application 150.

At step 514, management application 150 may be configured to evaluate the received message data against the implemented communication restriction configuration. For example, management application 150 may identify the contact or contacts involved in the text communication and determine whether each contact is a member of a defined list of contacts for managed device 138. As another example, management application 150 may determine that the implemented communication restriction configuration prohibits certain application functionality of user application 175. For example, user application 175 may be a text and video chat application but the communication restriction configuration may restrict the use of user application 175 to just text communication. Accordingly, management application 150 may evaluate the message data to determine the type of input coming from the user and whether it is an attempt to initiate a video chat.

At step 516, management application 150 determines that the message data represents a permissible or approved interaction or user action. For example, management application 150 may determine that a text communication is approved because it involves a contact or contacts that are on a limited contact list. The limited contact list may have been previously provided by, for example, a parent using controller device 140 as part of a communication restriction configuration. As another example, management application 150 may determine that the user has used managed device 138 in an approved manner per the communication restriction configuration. For example, the message data may represent an attempt to install a new application which may be on an approved application list according to the communication restriction configuration.

At step 518, management application 150 is configured to transmit an approval message to user application 175. In some embodiments, the approval message is configured to enable user application 175 to continue executing its functions with respect to the message data received at step 508.

At step 520, user application is configured to process the message data and perform any associated functions. For example, user application 175 may display a text communication interface that includes the approved contact. As another example, user application 175 may be an application store application and may install a requested application or feature for the user. After processing the message data at step 520, user application 175 is configured to output any processing results to network interface 170 at step 522.

In the embodiments described above with respect to FIG. 5, user application 175 is configured to forward incoming user inputs to management application 175 for approval. In other embodiments, management application 175 may directly intercept any incoming inputs. Management application 175 may determine any application or functionality that is required for the user input and contact the determined application. Management application 175 may provide the incoming user input to the application after approving the user input.

Figure 6:
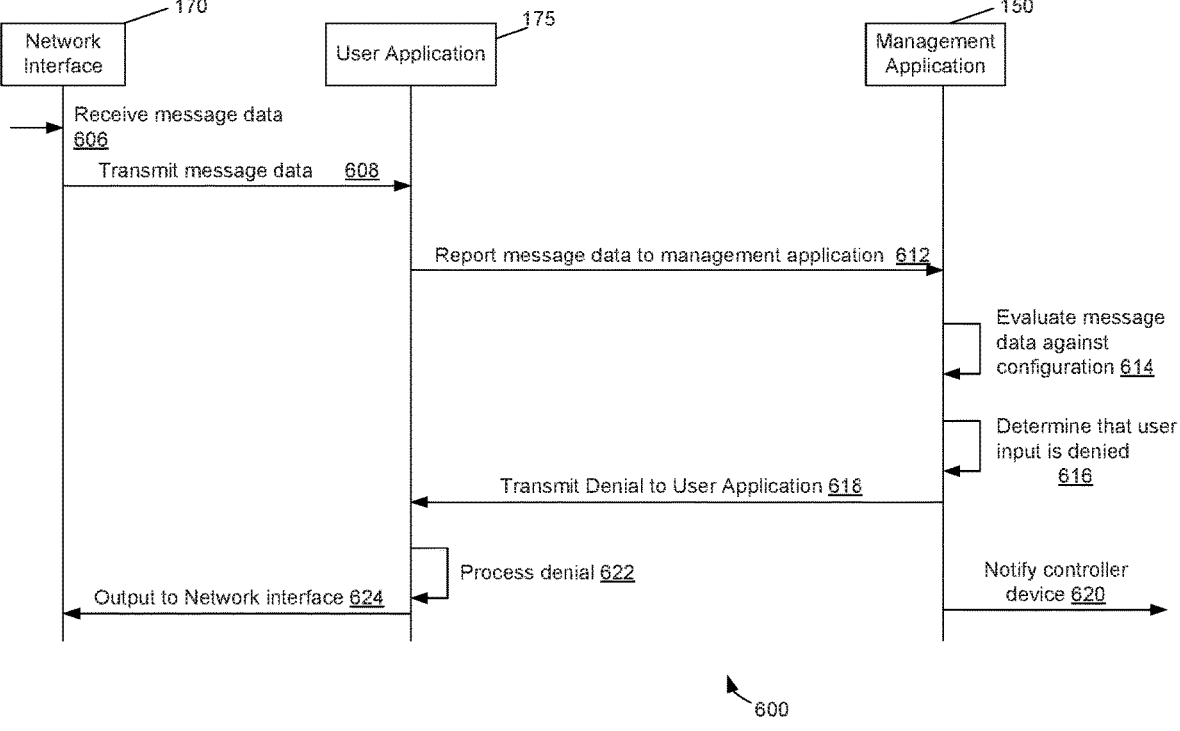
FIG. 6 is a system interaction diagram showing a management application of a managed device blocking an application function that is configured by a communication restriction configuration.

FIG. 6 is a system interaction diagram 600 showing a management application of a managed device blocking an application function that is configured by a communication restriction configuration.

As shown in FIG. 6, system interaction diagram 600 depicts network interface 170, user application 175, and management application 150 of managed device 138. FIG. 6 shows an example of how managed device 138 implements a communication restriction configuration received from, for example, controller device 140 shown in FIG. 1.

Network interface 170 of managed device 138 receives input data or output data, collectively termed message data, at step 606. For example, network interface 170 will receive input data relating to a message received at managed device 138 from another device. As another example, network interface 170 may receive output data indicating that a user of managed device 138 is transmitting a message to another device. More specifically, network interface 170 may be configured to process data such as touch inputs, display outputs, voice inputs, speaker outputs, application processes that result in outputs to the device user, and the like. For example, a child may use managed device 138 to select a contact from a contact list. As another example, a child may use managed device 138 and select an application icon on a touch-sensitive display screen of managed device 138. As yet another example, managed device 138 may receive communications from another device or receive application data for an application (e.g., online gaming applications may transmit data between devices to facilitate online game play).

At step 608, network interface 170 may transmit the received message data to user application 175. In some embodiments, user application 175 is configured to transmit the message data at step 612 without performing any additional processing to management application 150. For example, a child may use managed device 138 to enter a contact's information and attempt to initiate a text conversation involving the contact. Accordingly, the message data may include communication input indicating the contact, type of application, means of communication, time information, or the like. By default, a user application such as user application 175 may be configured to process the message data and perform various functions. For example, the user application may display an interface showing text communications. However, the implementation of the communication restriction configuration causes user application 175 to simply forward the message data to management application 150.

At step 614, management application 150 may be configured to evaluate the received message data against the implemented communication restriction configuration. For example, management application 150 may identify the contact or contacts involved in the text communication and determine whether each contact is a member of a defined list of contacts for managed device 138. As another example, management application 150 may determine that the implemented communication restriction configuration prohibits certain application functionality of user application 175. For example, user application 175 may be a text and video chat application but the communication restriction configuration may restrict the use of user application 175 to just text communication. Accordingly, management application 150 may evaluate the message data to determine the type of input coming from the user and whether it is an attempt to initiate a video chat.

At step 616, management application 150 determines that the message data represents an impermissible or prohibited interaction or user action. For example, management application 150 may determine that a text communication is prohibited because it involves a contact or contacts that are not on a limited contact list. The limited contact list may have been previously provided by, for example, a parent using controller device 140 as part of a communication restriction configuration. As another example, management application 150 may determine that the user has used managed device 138 in a prohibited manner per the communication restriction configuration. For example, the message data may represent an attempt to install a new application which may be on a prohibited application list according to the communication restriction configuration. As yet another example, management application 150 may detect that a child is attempting to use a different user account (e.g., a different account that would not be subject to communication restriction configurations).

At step 618, management application 150 is configured to transmit a denial message to user application 175. In some embodiments, the denial message is configured to prevent user application 175 from executing any functions with respect to the message data received at step 608. In some embodiments, the communication restriction configuration may be configured to limit the use of managed device 138 (e.g., by limiting communications to a contact list) and also report any attempts to work around or defeat the communication restriction configuration to controller device 140. Accordingly, at step 620, management application 150 may be configured to notify controller device 140 of an attempt to circumvent a communication restriction configuration on managed device 138.

At step 622, user application is configured to process the denial message and perform any associated functions. For example, user application 175 may display a message indicating that the attempted action was prohibited according to the communication restriction configuration implemented on managed device 138. As another example, user application 175 may deactivate an activated feature or initiated communication. After processing the denial message at step 622, user application 175 is configured to output any processing results to network interface 170 at step 624.

Figure 7:
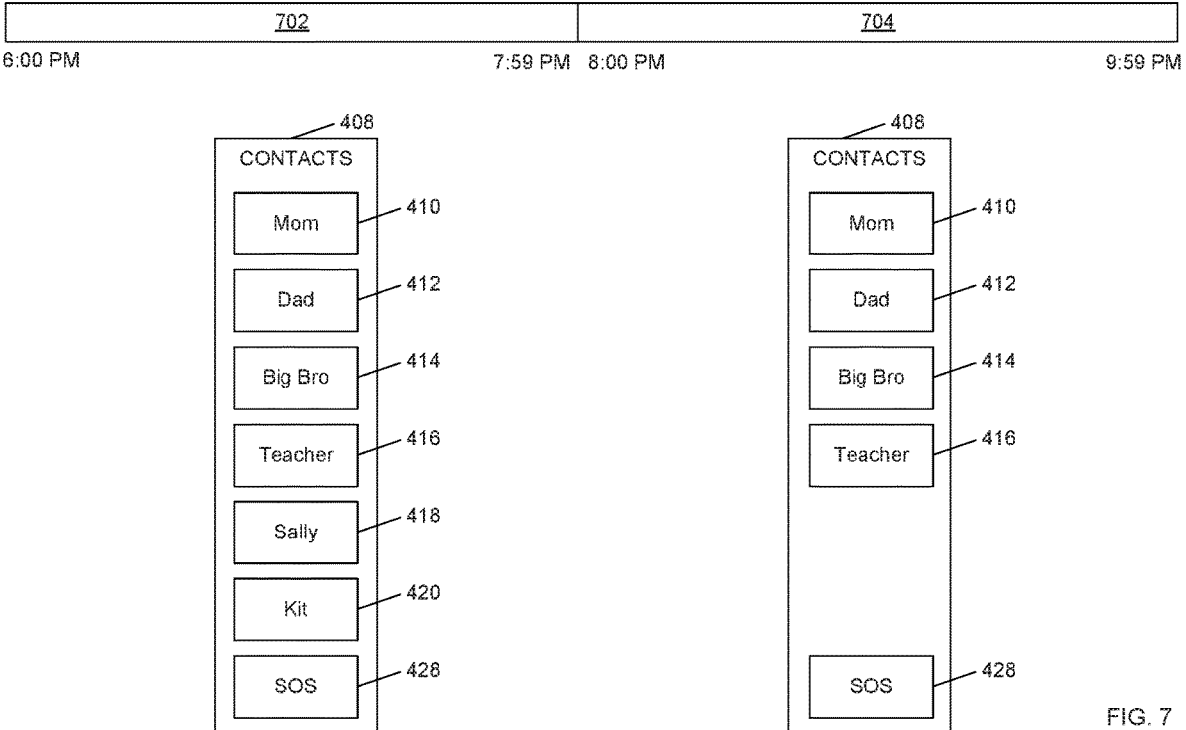
FIG. 7 shows a user interface of a managed device while a communication restriction configuration enforces various limited communication states on the managed device.

FIG. 7 shows a user interface 408 of a managed device while a communication restriction configuration enforces various limited communication states on the managed device.

More specifically, FIG. 7 shows a contact list displayed on managed device 138 over time as managed device 138 enters limited communication states defined by an implemented communication restriction configuration. In some embodiments, a communication restriction configuration transmitted by controller device 140 may define that communication with certain contacts is permitted only during certain times. For example, a parent may define that a child is always able to contact her parents using managed device 138 but can only contact her friends during certain times (e.g., only between 6 PM and 8 PM). Stages 702 and 704 may depict one or more display interfaces of a communication application installed on managed device 138. As noted above, FIG. 7 illustrates such communication restriction configurations with respect to a contact list or communications application; however, the systems and methods described herein are equally applicable to any functionality of managed device 138. For example, the communication restriction configuration may disable a certain application entirely (e.g., a social media application) after a certain time of day. As another example, the communication restriction configuration may disable a certain feature of an application (e.g., the video chat feature of a text chat and video chat application). As yet another example, the communication restriction configuration may disable an application's ability to send or receive attachment files.

In some embodiments, stages 702 and 704 may represent display screens of a natively installed application. A natively installed application may be an application produced by a manufacturer of managed device 138 or by a first software vendor that produces the operating system or be an approved application that is preinstalled on managed device 138 when managed device 138 is first activated or turned on. In other embodiments, stages 702 and 704 may represent display screens of a third-party application. A third-party application may be an application that is produced by a software vendor other than the first software vendor. Controller device 140 may generate communication restriction configurations that are equally applicable to both natively installed and third-party applications.

Stage 702 shows contact list 408 (similar to contact list 408 shown in FIG. 4). As described above with respect to FIG. 4, contact list 408 is defined using a communication restriction configuration that managed device 138 previously received from controller device 140. Accordingly, contact list 408 displays, at stage 702, parent contact 410, parent contact 412, sibling contact 414, teacher contact 416, friend contact 418, friend contact 420, and emergency contact 428. For example, a parent may have defined the communication restriction configuration to cause managed device 138 to limit its contact list to just these particular contacts. Moreover, the parent may configure the communication restriction configuration to cause managed device 138 to further reduce the list to just a subset of contacts (e.g., just the child's parents) for certain times.

In some embodiments, stage 702 represents a particular time period. For example, stage 702 refers to the time starting at 6:00 PM and ending at 7:59 PM on a particular day. Between these times, managed device 138 displays the abovementioned contacts as available for communication by a user of managed device 138.

In addition to defining particular contacts, the communication restriction configuration is designed to restrict communication with certain contacts even further based on specific times. In some embodiments, a communication restriction configuration will disable communication with some or all contacts after a certain time. For example, as shown in stage 704, contact list 408 is automatically updated at 8:00 PM on the particular day. At stage 704, contact list 408 now shows only parent contact 410, parent contact 412, sibling contact 414, teacher contact 416, and emergency contact 428. Friend contact 418 and friend contact 420 have been removed from the display of contact list 408. The communication restriction configuration has disabled communication with friend contact 418 and friend contact 420 starting at 8:00 PM on that day. For example, a parent may have determined that a child should not be allowed to communicate with friend contact 418 and friend contact 420 after 8:00 PM. Stage 704 shows that interaction controls (e.g., buttons) for friend contact 418 and friend contact 420 have simply disappeared. In other embodiments, the interaction controls for friend contact 418 and friend contact 420 may have a different display appearance. For example, the disabled controls may be grayed out or otherwise deemphasized to indicate that they are unavailable.

As described above, controller device 140 may be configured to generate communication restriction configurations that apply equally to both natively installed applications and third-party applications. In the example described above, the communication restriction configuration will cause a third-party application (e.g., a third-party messaging application) to update its display and remove, for example, interaction controls for particular contacts, interaction controls enabling contact updates, and the like. Moreover, the communication restriction configuration still permits the third-party application to operate in the limited manner defined by the communication restriction configuration, rather than being completely disabled.

As noted above, FIG. 7 illustrates the ability of a parent to disable communication with certain contacts after a time, but a similar communication restriction configuration may disable use of certain applications from a list of applications after a time.

Figure 8:
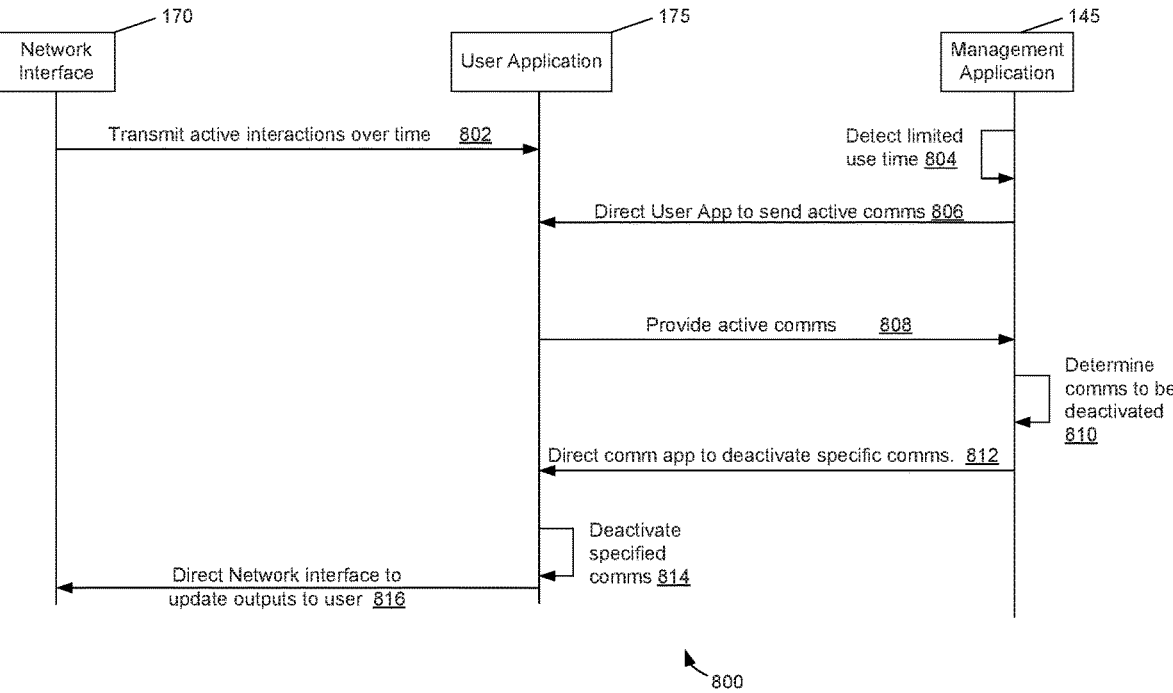
FIG. 8 is a system interaction diagram for an example system for remotely configuring communication restrictions that include enforcing periods of limited communication on a managed device.

FIG. 8 is a system interaction diagram 800 for an example system for remotely configuring communication restrictions that include enforcing periods of limited communication on a managed device.

In some embodiments, management application 150, user application 175, and network interface 170 of managed device 138 exchange communications over time. Management application 150 is configured to apply received communication restriction configurations to restrict the functionality of user application 175. In some embodiments, network interface 170 transmits user inputs and outputs over time to user application 175 at step 802. As an example, user application 175 may be a text messaging application that enables multiple text conversations with one or more contacts in each text conversation at a time. User application 175 processes inputs and outputs according to user interactions. For example, user application 175 may process text inputs that are intended to be text messages and display these on a display screen of management application 150 and also transmit these text messages to one or more recipients in an active text message conversation. The text message conversation display may be rendered with specific colors and display schemes (e.g., to indicate distinctions between sent and received messages).

At step 804, management application 150 detects that a limited use time is approaching. For example, and as described above with respect to FIG. 7, the time may be approaching 8:00 PM. The active communication restriction configuration may dictate that communication with certain contacts is prohibited after 8:00 PM. Management application 150 may, at step 806, direct user application 175 to transmit a summary of all active communications to management application 150. At step 808, user application 175 may transmit a summary of all active communications. The abovementioned summary may include, for example, a list of active communications and a list of contacts involved in each communication.

At step 810, management application 150 reviews the summary of communications and determines whether a communication restriction configuration impacts any of the active communications. For example, a parent may have generated a communication restriction configuration that prohibits communication with friend contact 418 and friend contact 420 after 8:00 PM. Accordingly, management application 150 is configured to determine whether any active communication involves friend contact 418 or friend contact 420. In some embodiments, management application 150 determines that at least one active communication involves a contact that is now prohibited for communication. Management application 150 is configured to identify the particular contact and active communication and direct, at step 812, user application 175 to deactivate the active communication involving the identified contact. For example, a text conversation involving the child and friend contact 420 may be deactivated at 8:00 PM so that the child cannot send or receive communications to or from friend contact 420.

In some embodiments, an active communication may include a first contact that is prohibited for communication after a certain time but also include a second contact that is approved for communication even after the certain time. The communication restriction configuration may define that conversations involving a contact impacted by a time-based limitation may be allowed to continue if the conversation also includes an approved third contact. For example, a group text conversation including the child, the child's parent (e.g., a user of controller device 140) and friend contact 418 may be allowed to continue due to the presence of the child's parent, despite the presence of friend contact 418 beyond a certain time. Accordingly, management application 150 may be configured to allow such communications to continue. In other embodiments, management application 150 may provide additional user interface controls to enable the child to invite an approved contact into a conversation that is about to be deactivated due to the presence of a now-prohibited contact.

At step 814, user application 175 is configured to deactivate the active communications specified by management application 150. At step 816, user application 175 may be configured to direct network interface 170 to update its outputs to the user. For example, network interface 170 may gray out now-deactivated communications or provide a visual and/or audio indication that a communication is ending or has ended.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

FIG. 9 is a flow diagram showing a process 900 used by a managed device to determine whether a sender of communication restriction configurations is authorized to implement those configurations on the computing device.

As described above with respect to FIG. 1, managed device 138 may be included in family group 180 with controller device 140 such that controller device 140 can be used to implement communication restriction configurations on managed device 138. In addition, a parent may create a user account family that includes the parent's user account with permissions to generate communication restriction configurations and implement those configurations on a child's managed device. The parent may configure the family group of user accounts such that any device on which the child uses the child's own user account becomes a managed device. In some embodiments, the child's managed device can receive and apply communication restriction configurations only from a device associated with an authorized user account (e.g., the parent's user account) in the family group of accounts.

Process flow 900 shows that, at step 902, managed device 138 receives a data message including a communication restriction configuration for managing managed device 138. In some embodiments, managed device 138 determines that the communication restriction configuration originates from controller device 140 associated with an authorized user account within the family group (e.g., a parent's account). As described above, a parent may implement communication restriction configurations for a child's managed device. Managed device 138 may receive the communication restriction configuration via server device 110, as described above with respect to FIG. 2. For example, a user may activate managed device 138 for the first time after manufacture or purchase. The child may begin using managed device 138 with the child's user account. Server device 110 may receive a notification that managed device 138 is being used with the child's account. Server device 110 may determine that the user account belongs to a user that requires or has previously been designated as a user requiring communication restriction configuration for any of the user's devices. In response to the determination, server device 110 may automatically push, to managed device 138, any stored communication restriction configurations. For example, a parent may have previously created communication restriction configurations for the child and transmitted these to server device 110 (e.g., when configuring an older managed device).

In other embodiments, communication restriction configurations may be transmitted directly from controller device 140 through a direct connection between controller device 140 and managed device 138 as described above with respect to FIG. 3.

Managed device 138 is configured to identify, at step 904, based on the data message, an account identifier for the parent that is associated with controller device 140. In one embodiment, managed device 138 may determine the originating device that transmitted the communication restriction configuration. This may be, for example, controller device 140. Having identified controller device 140, managed device 138 may be configured to determine an account identifier of a user of controller device 140. In another embodiment, managed device 138 may retrieve an account identifier that is transmitted with the communication restriction configuration. For example, server device 110 may transmit the communication restriction configuration and an account identifier for the user that created the communication restriction configuration.

Managed device 138 may be configured to determine, at step 906, that the account identifier is a member of a family group of account identifiers. For example, managed device 138 may recognize the account identifier of a parent as being part of the user account family described above as being set up by the parent. Managed device 138 may also recognize that the account identifier has associated permissions that enable it to apply communication restriction configurations to managed device 138. Managed device 138 may further recognize the account identifier to belong to a family group of account identifiers (e.g., a family of users) that also includes the user account identifier currently being used to operate managed device 138.

In response to determining that the account identifier associated with the received communication restriction configuration is authorized, managed device 138 is configured, at step 908, to automatically apply the communication restriction configuration. In one embodiment, managed device 138 implements the communication restriction configuration to restrict access to one or more communication features of the managed device. For example, managed device 138 may prohibit communication with contacts that are not on an approved contact list and/or disable controls that can be used to add new contacts. In other embodiments, managed device 138 modifies one or more features or capabilities of an application. For example, managed device 138 may modify communication features of an online gaming application such that a user may be able to still use the online gaming application to a play a game but be unable to communicate with any other user.

Figure 10:
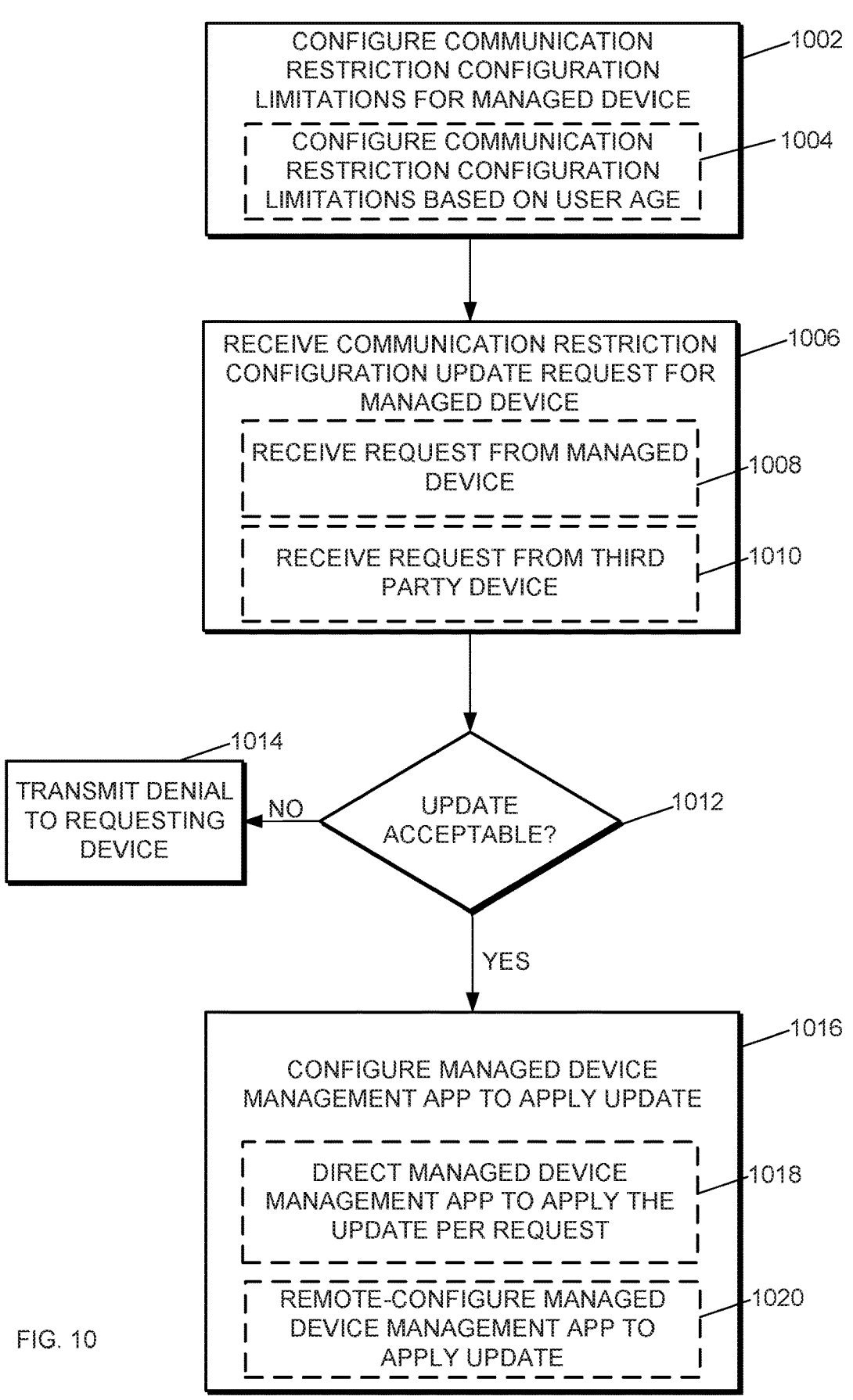
FIG. 10 is a flow diagram of an example process used by a controller device for creating communication restrictions.

FIG. 10 is another flow diagram of an example process 1000 for creating communication restrictions. For example, process 1000 can be performed by a computing device (e.g., controller device 140). More specifically, process 1000 illustrates how, in some embodiments, controller device 140 generates and updates communication restriction configurations for managed device 138.

At step 1002, controller device 140 may be configured to generate communication restriction configurations for managed device 138. For example, controller device 140 presents the parent with a configuration editing interface that enables the parent to select the targeted managed device and particular configuration parameters. For example, controller device 140 may present parent with a list of all installed applications on managed device 138 and possible configuration parameters. The configuration parameters may be represented by each application feature that can be managed or prohibited. Moreover, controller device 140 may present a list of operating system or device functions that the parent can manage or restrict.

In another embodiment, controller device 140 is configured to enable a parent to control settings of managed device 138 as if the parent were actually using managed device 138 at that time and not controller device 140. For example, controller device 140 may display a mirrored view of managed device 138 so that the parent can see, on controller device 140, any screen, interface, or control that is viewable on managed device 138. Controller device 140 may grant the parent the capability to use controls on managed device 138 while they are viewed on controller device 140. For example, the parent may be able to view screens, activate interactive controls, and view settings of managed device 138 while on controller device 140. As another example, the parent may be able to view and interact with management application 150 of managed device 138 instead of or in addition to management application 145 of controller device 140 (as shown in FIG. 1).

As described above, these communication restriction configurations may act to manage or restrict one or more features or functionalities of managed device 138. Controller device 140 implements the generated communication restriction configurations by transmitting them to managed device 138 as described above with respect to FIG. 2 or 3.

More particularly, and as shown at step 1004, controller device 140 may be used to create communication restriction configurations based on the age of a user of managed device 138. For example, the communication restriction configuration may define application use privileges based on age. As a more specific example, a parent may define the communication restriction configuration so that while the parent's child (e.g., the user of managed device 138) is less than thirteen years old, the child cannot install or use any social media application. As described above, the child's user account may have an associated birth date. Once the child attains thirteen years of age, the communication restriction configuration may be configured to remove the social media application installation and use restrictions from managed device 138. Furthermore, when the child reaches eighteen years of age, the communication restriction configuration may be configured to limit itself to a monitoring state with no usage restrictions, or automatically erase itself from managed device 138.

One or more of controller device 140, server device 110 (shown in FIG. 1), and managed device 138 may be configured to monitor the age of the child. For example, management application 150 of managed device 138 (shown in FIG. 1) may respond to any attempts to install a social media application on managed device 138 by checking the user's current age as associated with the user's account that is currently associated with managed device 138. If the user has not attained the appropriate age, managed device 138 may be configured by the communication restriction configuration to prohibit application installation.

At step 1006, controller device 140 may receive a request to update an existing communication restriction configuration (e.g., one that was applied at step 1002 above). For example, a communication restriction configuration may define a specific list of approved contacts and a child may wish to add a new contact to the list. In one embodiment, and as shown at step 1008, the request may originate from managed device 138. In another embodiment, and as shown at step 1010, the request may originate from another device that is not controller device 140 or managed device 138. For example, the child's friend may communicate with controller device 140 to request that the friend be allowed to communicate with the child.

At step 1012, controller device 140 evaluates whether the communication restriction configuration update should be approved. For example, controller device 140 may be configured to present a notification to the user (e.g., a parent) that there is a request to update an existing communication restriction configuration. In some embodiments, the notification may include the nature of the update, the associated managed device, and other information. The notification may invite the parent to contact the user of managed device 138 to discuss the update.

If the update is not acceptable to the parent, controller device 140 is configured, at step 1014, to deny the update request. In some embodiments, controller device 140 transmits a denial message to the requesting device and any other devices impacted by the denial. For example, controller device 140 may transmit a denial message to managed device 138. If a third device was impacted (e.g., a friend's device where the friend was trying to communicate with the child), controller device 140 is configured to transmit the denial message to the third device as well.

If the update is approved, controller device 140 is configured to update the communication restriction configuration and apply it to managed device 138 at step 1016. In some embodiments, controller device 140 presents the parent with a similar configuration editing interface that was used to initially generate the configuration. For example, if the parent initially used management application 150 of managed device 138, then management application 150 is again presented to enable the parent to make updates. For example, management application 150 may be updated to remove an application restriction from managed device 138. Similarly, the parent may have viewed contact list 408 of managed device 138 directly on controller device 140 in order to add contacts that the child was authorized to communicate with. To include a new contact, the parent may be able to view again, on controller device 140, contact list 408. In some embodiments, contact list 408 may be configured so that when it displays on controller device 140, it includes the full functionality of user application 175 that would ordinarily display contact list 408. For example, contact list 408 may be displayed in conjunction with interactive tools or controls enabling addition, updates, and deletion of contacts from contact list 408.

More particularly, and as shown at step 1018, controller device 140 may be configured to direct management application 150 of managed device 138 to apply the communication restriction configuration update.

Alternatively, and as shown at step 1020, controller device 140 may be configured to remotely configure management application 150 of managed device 138 to apply the communication restriction configuration update. In yet another embodiment, controller device 140 may be configured to remotely configure any application or functionality (e.g., user application 175) of managed device 138 to apply the communication restriction configuration update.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from specific and legitimate sources to enable users to remotely configure communication restrictions. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to enable users to remotely configure communication restrictions. Accordingly, use of such personal information data allows users (such as parents) more finely tailored control over managed devices (such as those used by those parents' children). Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, enabling users to remotely configure communication restrictions, the present technology can be configured to allow users to select to "opt in" or "opt out" of participation in the collection of personal information data during registration for services or anytime thereafter. In another example, users can select not to provide user account data or device data for enabling users to remotely configure communication restrictions. In yet another example, users can select to limit the length of time account data or device data is maintained or entirely block the ability to create communication restriction configurations. In addition to providing "opt in" and "opt out" options, the present disclosure contemplates providing notifications relating to the access or use of personal information. For instance, a user may be notified upon activating a computing device that the user's personal information data may be accessed and then reminded again just before personal information data is accessed by, for example, a management application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, communication restriction configurations can be generated based on aggregated non-personal information data or a bare minimum amount of personal information, such as the content being handled only on the user's device or other non-personal information available to the communication restriction configuration services.

Example System Architecture

Figure 11:
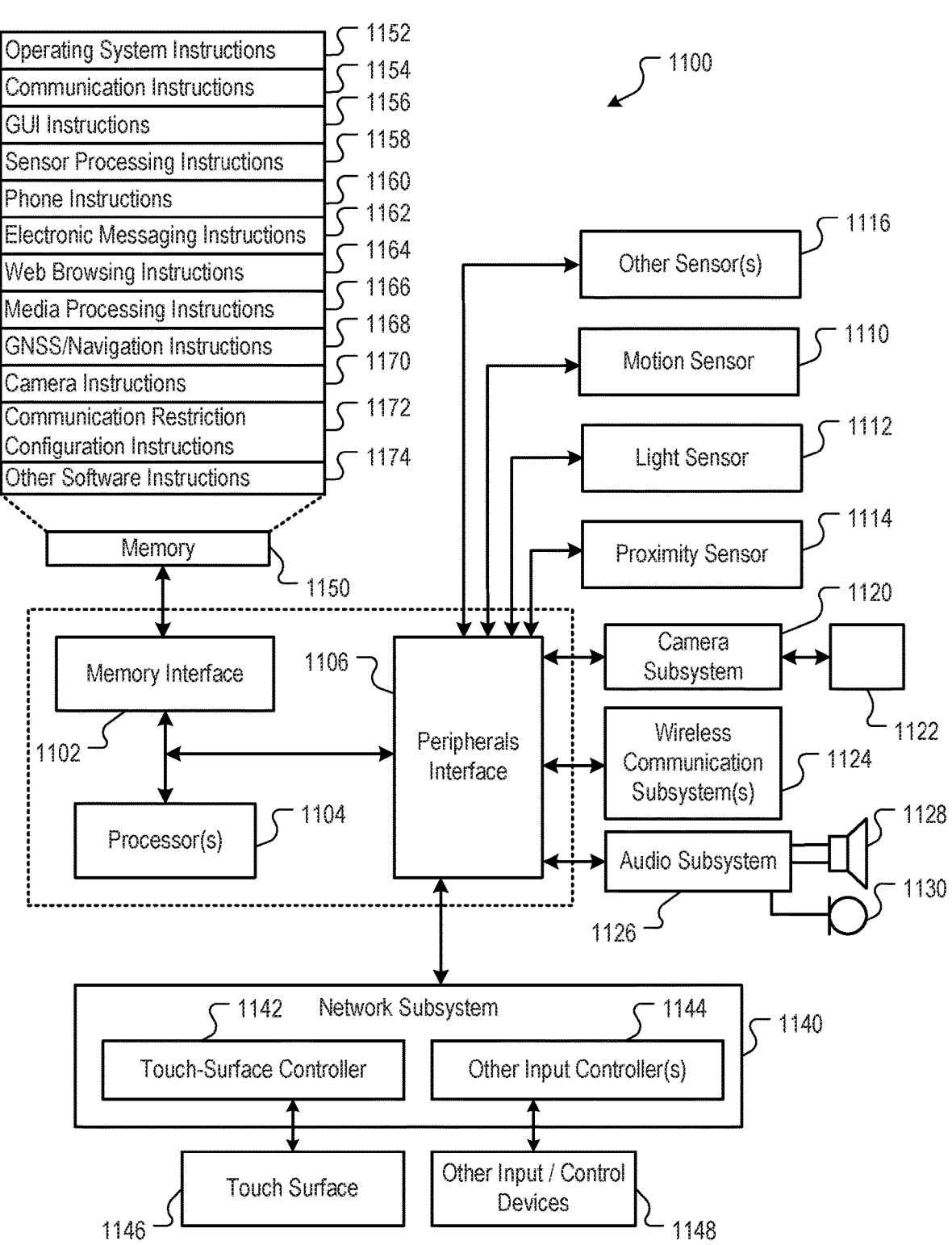
FIG. 11 is a block diagram of an example computing device that can implement the features and processes of FIGS. 1-10.

FIG. 11 is a block diagram of an example computing device 1100 that can implement the features and processes of FIGS. 1-10. The computing device 1100 can include a memory interface 1102, one or more data processors, image processors and/or central processing units 1104, and a peripherals interface 1106. The memory interface 1102, the one or more processors 1104 and/or the peripherals interface 1106 can be separate components or can be integrated in one or more integrated circuits. The various components in the computing device 1100 can be coupled by one or more communication buses or signal lines.

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate orientation, lighting, and proximity functions. Other sensors 1116 can also be connected to the peripherals interface 1106, such as a global navigation satellite system (GNSS) (e.g., GPS receiver), a temperature sensor, a biometric sensor, magnetometer or other sensing device, to facilitate related functionalities.

A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips. The camera subsystem 1120 and the optical sensor 1122 can be used to collect images of a user to be used during authentication of a user, e.g., by performing facial recognition analysis.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network(s) over which the computing device 1100 is intended to operate. For example, the computing device 1100 can include communication subsystems 1124 designed to operate over a GSM network, a GPRS network, an EDGE network, a Wi-Fi or WiMax network, and a Bluetooth™ network. In particular, the wireless communication subsystems 1124 can include hosting protocols such that the device 100 can be configured as a base station for other wireless devices.

An audio subsystem 1126 can be coupled to a speaker 1128 and a microphone 1130 to facilitate voice-enabled functions, such as speaker recognition, voice replication, digital recording, and telephony functions. The audio subsystem 1126 can be configured to facilitate processing voice commands, voiceprinting and voice authentication, for example.

The I/O subsystem 1140 can include a touch-surface controller 1142 and/or other input controller(s) 1144. The touch-surface controller 1142 can be coupled to a touch surface 1146. The touch surface 1146 and touch-surface controller 1142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1146.

The other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of the speaker 1128 and/or the microphone 1130.

In one implementation, a pressing of the button for a first duration can disengage a lock of the touch surface 1146; and a pressing of the button for a second duration that is longer than the first duration can turn power to the computing device 1100 on or off. Pressing the button for a third duration can activate a voice control, or voice command, module that enables the user to speak commands into the microphone 1130 to cause the device to execute the spoken command. The user can customize a functionality of one or more of the buttons. The touch surface 1146 can, for example, also be used to implement virtual or soft buttons and/or a keyboard.

In some implementations, the computing device 1100 can present recorded audio and/or video files, such as MP3, AAC, and MPEG files. In some implementations, the computing device 1100 can include the functionality of an MP3 player, such as an iPod™.

The memory interface 1102 can be coupled to memory 1150. The memory 1150 can include high-speed random-access memory and/or non-volatile memory, such as one or more magnetic disk storage devices, one or more optical storage devices, and/or flash memory (e.g., NAND, NOR). The memory 1150 can store an operating system 1152, such as Darwin, RTXC, LINUX, UNIX, OS X, WINDOWS, or an embedded operating system such as VxWorks.

The operating system 1152 can include instructions for handling basic system services and for performing hardware dependent tasks. In some implementations, the operating system 1152 can be a kernel (e.g., UNIX kernel). In some implementations, the operating system 1152 can include instructions for performing voice authentication. For example, operating system 1152 can implement the features for generating and applying communication restriction configurations as described with reference to FIGS. 1-10.

The memory 1150 can also store communication instructions 1154 to facilitate communicating with one or more additional devices, one or more computers and/or one or more servers. The memory 1150 can include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Navigation instructions 1168 to facilitate GNSS and navigation-related processes and instructions; and/or camera instructions 1170 to facilitate camera-related processes and functions.

The memory 1150 can store software instructions 1172 to facilitate other processes and functions, such as the processes and functions for generating and applying communication restriction configurations as described with reference to FIGS. 1-10.

The memory 1150 can also store other software instructions 1174, such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions of the computing device 1100 can be implemented in hardware and/or in software, including in one or more signal processing and/or application specific integrated circuits.

What is claimed is:

1. A method implemented by a management application on a managed device associated with a first account identifier corresponding to a first user, the method comprising:
receiving, at the managed device, a first message including a first communication restriction configuration for managing the managed device from a controller device, the first configuration defined by a second user of the controller device, the second user corresponding to a second user account, wherein the communication restriction configuration is encrypted such that only the controller device and the managed device can access the communication restriction configuration;
identifying, based on the first message, the second account identifier associated with the controller device;
determining that the second account identifier is a member of a trusted group of account identifiers that includes the first account identifier; and
in response to the determination, automatically configuring the managed device based on the first communication restriction configuration and a contacts database, including restricting access to one or more communication features of the managed device,
wherein configuring the managed device based on the first communication restriction configuration comprises restricting the first user from configuring the contacts database on the managed device,
wherein the contacts database defines account identifiers associated with user devices with which the managed device is allowed to communicate.

2. The method of claim 1, further comprising:
identifying that the first communication restriction configuration authorizes a first communication feature and deauthorizes a second communication feature;
allowing access to the first communication feature; and
preventing access to the second communication feature.

3. The method of claim 2, wherein the first communication feature corresponds to a first application installed on the managed device and the second communication feature corresponds to a second application installed on the managed device.

4. The method of claim 2, wherein the first communication feature corresponds to a first application feature of a first application installed on the managed device and the second communication feature corresponds to a second application feature of the first application.

5. The method of claim 1, further comprising:
receiving, at the managed device, a first communication from a third device associated with a third account identifier;
based on the first communication restriction configuration and the third account identifier, determining that the managed device is configured to prevent communication with the third device; and
suppressing the first communication with the third device.

6. The method of claim 1, further comprising:
determining that the first communication restriction configuration restricts communication with a third device associated with a third account identifier during a first time period;
detecting an active communication session involving the managed device and the third device; and
determining that a current time is within the first time period; and
terminating the active communication session with the third device.

7. The method of claim 1, further comprising:

receiving the first communication restriction configuration including a first communication restriction setting and a second communication restriction setting;

determining, by the managed device, an age of the first user of the managed device;

when the age is less than a threshold value, configuring the managed device based on the first communication restriction setting and the second communication restriction setting; and when the age is greater than or equal to the threshold value, configuring the managed device based on the first communication restriction setting while disregarding the second communication restriction setting.

8. The method of claim 1, further comprising:

receiving, at the managed device, user input to add a new contact to the contacts database while access to the one or more communication features is restricted; and responsive to the user input to add the new contact to the contacts database, displaying, by the managed device, a message denying addition of the new contact.

9. A non-transitory computer readable medium storing a program for execution by at least one processor of a managed device associated with a first account identifier corresponding to a first user, the program comprising sets of instructions for:

receiving, at the managed device, a first message including a first communication restriction configuration for managing the managed device from a controller device, the first configuration defined by a second user of the controller device, the second user corresponding to a second user account, wherein the communication restriction configuration is encrypted such that only the controller device and the managed device can access the communication restriction configuration;

identifying, based on the first message, the second account identifier associated with the controller device;

determining that the second account identifier is a member of a trusted group of account identifiers that includes the first account identifier; and in response to the determination, automatically configuring the managed device based on the first communication restriction configuration and a contacts database, including restricting access to one or more communication features of the managed device, wherein configuring the managed device based on the first communication restriction configuration comprises restricting the first user from configuring the contacts database on the managed device, wherein the contacts database defines account identifiers associated with user devices with which the managed device is allowed to communicate.

10. The non-transitory computer readable medium of claim 9, wherein the program further comprises sets of instructions for:

identifying that the first communication restriction configuration authorizes a first communication feature and deauthorizes a second communication feature;

allowing access to the first communication feature; and preventing access to the second communication feature.

11. The non-transitory computer readable medium of claim 10, wherein the first communication feature corresponds to a first application installed on the managed device and the second communication feature corresponds to a second application installed on the managed device.

12. The non-transitory computer readable medium of claim 10, wherein the first communication feature corresponds to a first application feature of a first application installed on the managed device and the second communication feature corresponds to a second application feature of the first application.

13. The non-transitory computer readable medium of claim 9, wherein the program further comprises sets of instructions for:

receiving, at the managed device, a first communication from a third device associated with a third account identifier;

based on the first communication restriction configuration and the third account identifier, determining that the managed device is configured to prevent communication with the third device; and suppressing the first communication with the third device.

14. The non-transitory computer readable medium of claim 9, wherein the program further comprises sets of instructions for:

determining that the first communication restriction configuration restricts communication with a third device associated with a third account identifier during a first time period;

detecting an active communication session involving the managed device and the third device; and determining that a current time is within the first time period; and terminating the active communication session with the third device.

15. The non-transitory computer readable medium of claim 9, wherein the program further comprises sets of instructions for:

receiving the first communication restriction configuration including a first communication restriction setting and a second communication restriction setting;

determining, by the managed device, an age of the first user of the managed device;

when the age is less than a threshold value, configuring the managed device based on the first communication restriction setting and the second communication restriction setting; and when the age is greater than or equal to the threshold value, configuring the managed device based on the first communication restriction setting while disregarding the second communication restriction setting.

16. The non-transitory computer readable medium of claim 9, wherein the program further comprises sets of instructions for:

receiving, at the managed device, user input to add a new contact to the contacts database while access to the one or more communication features is restricted; and responsive to the user input to add the new contact to the contacts database, displaying, by the managed device, a message denying addition of the new contact.

17. A managed device comprising:

a set of processing units;

a non-transitory computer readable medium storing a program for execution by the set of processing units, the program comprising sets of instructions for:

receiving, at the managed device, a first message including a first communication restriction configuration for managing the managed device from a controller device, the first configuration defined by a second user of the controller device, the second user corresponding to a second user account, wherein the communication restriction configuration is encrypted such that only the controller device and the managed device can access the communication restriction configuration;

identifying, based on the first message, the second account identifier associated with the controller device;

determining that the second account identifier is a member of a trusted group of account identifiers that includes the first account identifier; and in response to the determination, automatically configuring the managed device based on the first communication restriction configuration, including restricting access to one or more communication features of the managed device, wherein configuring the managed device based on the first communication restriction configuration comprises restricting the first user from configuring a contacts database on the managed device, and wherein the contacts database defines account identifiers associated with user devices with which the managed device is allowed to communicate.

18. The device of claim 17, wherein the program further comprises sets of instructions for:

identifying that the first communication restriction configuration authorizes a first communication feature and deauthorizes a second communication feature;

allowing access to the first communication feature; and preventing access to the second communication feature.

19. The device of claim 18, wherein the first communication feature corresponds to a first application installed on the managed device and the second communication feature corresponds to a second application installed on the managed device.

20. The device of claim 18, wherein the first communication feature corresponds to a first application feature of a first application installed on the managed device and the second communication feature corresponds to a second application feature of the first application.

21. The device of claim 17, wherein the program further comprises sets of instructions for:

receiving, at the managed device, a first communication from a third device associated with a third account identifier;

based on the first communication restriction configuration and the third account identifier, determining that the managed device is configured to prevent communication with the third device; and suppressing the first communication with the third device.

22. The device of claim 17, wherein the program further comprises sets of instructions for:

determining that the first communication restriction configuration restricts communication with a third device associated with a third account identifier during a first time period;

detecting an active communication session involving the managed device and the third device; and determining that a current time is within the first time period; and terminating the active communication session with the third device.

23. The device of claim 17, wherein the program further comprises sets of instructions for:

receiving the first communication restriction configuration including a first communication restriction setting and a second communication restriction setting;

determining, by the managed device, an age of the first user of the managed device;

when the age is less than a threshold value, configuring the managed device based on the first communication restriction setting and the second communication restriction setting; and when the age is greater than or equal to the threshold value, configuring the managed device based on the first communication restriction setting while disregarding the second communication restriction setting.

24. The device of claim 17, wherein the program further comprises sets of instructions for:

receiving, at the managed device, user input to add a new contact to the contacts database while access to the one or more communication features is restricted; and responsive to the user input to add the new contact to the contacts database, displaying, by the managed device, a message denying addition of the new contact.

* * * * *